US012706225B2

(12) United States Patent
Pamplin et al.

(10) Patent No.: US 12,706,225 B2
(45) Date of Patent: Aug. 11, 2026

(54) SEPARATION OF FISSION PRODUCTS IN A MOLTEN SALT REACTOR VIA ADSORBENT FRAMEWORKS

(71) Applicant: ABILENE CHRISTIAN UNIVERSITY, Abilene, TX (US)

(72) Inventors: Kim Pamplin, Abilene, TX (US); Diego Zometa, Abilene, TX (US); Victoriano Cooper, Abilene, TX (US); Thomas Hamilton, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 18/899,211

(22) Filed: Sep. 27, 2024

(65) Prior Publication Data

US 2025/0111957 A1 Apr. 3, 2025

Related U.S. Application Data

(60) Provisional application No. 63/586,832, filed on Sep. 29, 2023.

(51) Int. Cl.
*G21C 19/31* (2006.01)

(52) U.S. Cl.
CPC .................................... *G21C 19/31* (2013.01)

(58) Field of Classification Search
CPC ................................ G21C 19/30; G21C 19/31
See application file for complete search history.

(56) References Cited

U.S. PATENT DOCUMENTS 2,795,482 A 6/1957 McNabney
3,105,020 A 9/1963 Long
(Continued)

FOREIGN PATENT DOCUMENTS

CA 3179052 11/2021
CA 3085050 12/2021
(Continued)

OTHER PUBLICATIONS

Chung, Yongchul G., et al. "Advances, updates, and analytics for the computation-ready, experimental metal-organic framework database: Core Mof 2019." Journal of Chemical & Engineering Data 64. 12 (2019): 5985-5998. (Year: 2019).*

(Continued)

*Primary Examiner* — Lily C Garner
(74) *Attorney, Agent, or Firm* — King & Spalding

(57) ABSTRACT

An extraction system includes an absorbent framework configured to withstand the harsh environment of a molten salt reactor system and capture fission products found in the molten salt of such systems. The extraction system further includes means for removing the absorbent framework from the flow of molten salt, such that the absorbent framework may be processed to harvest the fission products. The absorbent framework may include a temperature resistant cartridge configured to house an absorbent composition. The present invention contemplates multiple absorbent compositions including metal-organic frameworks with unique structures to provide thermal stability, carbon nanotubes, and absorbent microspheres. The metal-organic frameworks may be synthesized by a variety of techniques to impart particular characteristics advantageous for use in a molten salt reactor system.

18 Claims, 23 Drawing Sheets

(56) References Cited

U.S. PATENT DOCUMENTS

| | | | |
|---|---|---|---|
| 3,730,833 | A | 5/1973 | Cremeans |
| 3,843,765 | A | 10/1974 | Anderson |
| 4,005,178 | A | 1/1977 | LeBalnc |
| 4,069,100 | A | 1/1978 | Cooper |
| 4,075,060 | A | 2/1978 | Colburn |
| 4,094,953 | A | 6/1978 | Hadi et al. |
| 4,297,174 | A * | 10/1981 | Brambilla ............... G21F 9/302 205/49 |
| 4,332,170 | A | 6/1982 | Belval |
| 7,011,736 | B1 | 3/2006 | Miller et al. |
| 7,914,600 | B2 | 3/2011 | Withers et al. |
| 7,960,581 | B2 | 6/2011 | Vreede et al. |
| 8,226,760 | B2 | 7/2012 | Collier et al. |
| 8,442,182 | B2 | 5/2013 | Peterson |
| 8,821,824 | B2 | 9/2014 | Ghirelli et al. |
| 9,228,579 | B2 | 1/2016 | Stobbe |
| 9,847,149 | B2 | 12/2017 | Spoerke et al. |
| 10,388,419 | B2 | 8/2019 | Sakuma et al. |
| 10,416,045 | B2 | 9/2019 | Launiere et al. |
| 10,434,494 | B2 | 10/2019 | Kobayashi et al. |
| 10,566,101 | B2 | 2/2020 | Corpora |
| 11,459,662 | B2 | 10/2022 | Murahara |
| 12,254,994 | B1 | 3/2025 | Badalassi |
| 2005/0092070 | A1 | 5/2005 | Bhatti |
| 2006/0023829 | A1 | 2/2006 | Schnetner |
| 2011/0045971 | A1 | 2/2011 | Collier |
| 2012/0051481 | A1 | 3/2012 | Shu |
| 2012/0302811 | A1 | 11/2012 | Long |
| 2014/0044624 | A1 | 2/2014 | Ghirelli |
| 2014/0226775 | A1 | 8/2014 | Volpi |
| 2016/0189806 | A1 | 6/2016 | Cheatham |
| 2016/0189816 | A1 | 6/2016 | Czerwinski |
| 2016/0196888 | A1 | 7/2016 | Spoerke |
| 2017/0084355 | A1 | 3/2017 | Scott |
| 2017/0271033 | A1 | 9/2017 | Dodson |
| 2019/0107459 | A1 | 4/2019 | Lin |
| 2019/0371482 | A1 | 12/2019 | Benson |
| 2020/0122109 | A1 | 4/2020 | Kruizenga |
| 2020/0180975 | A1 | 6/2020 | Benson |
| 2020/0243207 | A1* | 7/2020 | Jiang ........................ G21C 1/16 |
| 2022/0223302 | A1 | 7/2022 | De Groot |
| 2022/0310281 | A1 | 9/2022 | Czerwinski |
| 2023/0088516 | A1 | 3/2023 | Bailey |
| 2023/0245794 | A1 | 8/2023 | Moskowitz |
| 2024/0127973 | A1 | 4/2024 | Davis |
| 2024/0312656 | A1 | 9/2024 | Pamplin et al. |
| 2024/0347222 | A1 | 10/2024 | Czerwinski |
| 2024/0428961 | A1* | 12/2024 | Pamplin ................. G21G 1/001 |
| 2025/0018367 | A1* | 1/2025 | Frattini .................... B01J 20/06 |
| 2025/0037889 | A1* | 1/2025 | Pamplin ................... G21C 3/54 |
| 2025/0109035 | A1* | 4/2025 | Pamplin .................. C22B 34/34 |
| 2025/0182919 | A1 | 6/2025 | Fitzgerald |
| 2025/0191800 | A1 | 6/2025 | Dunckley |
| 2025/0218608 | A1 | 7/2025 | Volpe |
| 2025/0246334 | A1 | 7/2025 | Botha |
| 2025/0266182 | A1 | 8/2025 | Czerwinski |
| 2025/0273355 | A1 | 8/2025 | Czerwinski |
| 2025/0273356 | A1 | 8/2025 | Czerwinski |

FOREIGN PATENT DOCUMENTS

| | | | |
|---|---|---|---|
| CN | 101376528 | 3/2009 | |
| CN | 101631642 | 1/2010 | |
| CN | 203400551 | 1/2014 | |
| CN | 109173419 | 1/2019 | |
| CN | 108179432 | 9/2019 | |
| CN | 110194494 | 9/2019 | |
| CN | 109637682 | 9/2020 | |
| CN | 113732294 | 12/2021 | |
| CN | 113851246 | 12/2021 | |
| CN | 113860350 | 12/2021 | |
| CN | 112125281 | 2/2022 | |
| CN | 112853100 | 7/2022 | |
| CN | 111785407 | 8/2022 | |
| CN | 112316724 | 11/2022 | |
| CN | 112863725 | 12/2022 | |
| CN | 112863726 | 12/2022 | |
| DE | 102010021605 A1 * | 11/2011 | ............... G21F 1/00 |
| EP | 0170033 | 5/1986 | |
| EP | 4338174 | 3/2024 | |
| EP | 4562209 | 6/2025 | |
| RU | 2499306 | 11/2013 | |
| RU | 215749 | 12/2022 | |
| WO | WO 2018/001469 | 1/2018 | |
| WO | WO 2018026536 | 2/2018 | |
| WO | WO 2018064572 | 4/2018 | |
| WO | WO 2019231971 | 1/2020 | |
| WO | WO 2024217652 | 10/2024 | |

OTHER PUBLICATIONS

Andrews, Hunter B., et al. "Review of molten salt reactor off-gas management considerations." Nuclear Engineering and Design 385 (2021): 111529. (Year: 2021).*

Andrews, Hunter B., Praveen K. Thallapally, and Alexander J. Robinson. "Monitoring xenon capture in a metal organic framework using laser-induced breakdown spectroscopy." Micromachines 14.1 (2022): 82. (Year: 2022).*

Banerjee, Debasis, et al. "Xenon gas separation and storage using metal-organic frameworks." Chem 4.3 (2018): 466-494. (Year: 2018).*

Baron et al. NEA (2022), Treatment of Volatile Fission Products, OECD Publishing, Paris. (Year: 2022).*

Degueldre, Claude, et al. "Fission gas released from molten salt reactor fuel: the case of noble gas short life radioisotopes for radiopharmaceutical application." Medicine in Novel Technology and Devices 10 (2021): 100057. (Year: 2021).*

Fayfar, Sean, et al. "In-situ analysis of corrosion products in molten salt: concurrent X-ray absorption and electrochemistry reveal both ionic and metallic species." (2022). (Year: 2022).*

Fayfar, Sean, et al. "In-situ analysis of corrosion products in molten salt: X-ray absorption reveals both ionic and metallic species." ACS omega 8.27 (2023): 24673-24679. (Year: 2023).*

Holcomb, David Eugene, et al. Molten salt reactor fundamental safety function PIRT. No. ORNL/TM-2021/2176. Oak Ridge National Laboratory (ORNL), Oak Ridge, TN (United States), 2021. (Year: 2021).*

Mcfarlane, Joanna, et al. Molten Salt Reactor Engineering Study for Off-Gas Management. No. ORNL/TM-2020/1602. Oak Ridge National Laboratory (ORNL), Oak Ridge, TN (United States), 2020. (Year: 2020).*

Riley, Brian J., et al. Identification of potential waste processing and waste form options for molten salt reactors. No. ORNL/LTR-2018/907. Oak Ridge National Laboratory (ORNL), Oak Ridge, TN (United States), 2018. (Year: 2018).*

Kashif, Muhammad, et al. "Functionalization of UiO-66-NH2 by in-situ incorporation of nanomaterials to enhance photocatalytic efficiency towards oxygen evolution reaction." Catalysis Letters 152.10 (2022): 3202-3212. (Year: 2022).*

Thallapally, Praveen K., et al. Noble Gas Management: SBMOF 1 vs. NUCON Carbon. No. PNNL-33314. Pacific Northwest National Laboratory (PNNL), Richland, WA (United States), 2022. (Year: 2022).*

Bhattarai, Deval Prasad, et al. "Recent progress in metal-organic framework-derived nanostructures in the removal of volatile organic compounds." Molecules 26.16 (2021): 4948. (Year: 2021).*

Wu, Ting, et al. "Zeolitic imidazolate framework-8 (ZIF-8) membranes for Kr/Xe separation." Industrial & Engineering Chemistry Research 56.6 (2017): 1682-1686. (Year: 2017).*

Robinson, Alexander J., et al. "Noble gas management with radiation-tolerant MOF for molten salt reactors." Cell Reports Physical Science 5.2 (2024). (Year: 2024).*

U.S. Appl. No. 18/663,976, filed May 14, 2024, Pamplin et al.

U.S. Appl. No. 18/783,094, filed Jul. 24, 2024, Pamplin et al.

U.S. Appl. No. 18/771,047, filed Jul. 24, 2024, Pamplin et al.

(56) References Cited

OTHER PUBLICATIONS

McDonald. "Challenges of Extracting and Purifying Fission-Produced Molybdenum-99" 3146-3150. Industrial & Engineering Chemistry Research. Jul. 29, 2000.

Rao. "Studies on separation and purification offission 99Mo from neutron activated uranium aluminum alloy" 186-191. Applied Radiation and Isotopes. Jul. 2014; < abstract; p. 187, col. 2, last paragraph; p. 188.

Cheng et al. Molten salt-assisted carbonized zeolite imidazolate framework on nickel foam for highly efficient iodide capture in fluoride molten salts (2023), Chemical Engineering Journal 477, (2023).

Hoyt, N. et al. "Online Monitoring of Molten Salt Reactors," Argonne National Laboratory (2019).

Furuichi et al. "Study on behavior of tritium in concrete wall," Journal of nuclear materials 350.3 (2006): 246-253.

H. Zhou, J. R. Long, O. M. Yaghi (2012). "Introduction to Metal-Organic Frameworks." Chemical Re-views. Chem. Rev. 2012, 112, 673-674.

Medha Kasula, Tin Le, Adrienne Thomsen, Milad Rabbani Esfahani (2022). "Silver metal organic frameworks and copper metal organic frameworks immobilized on graphene oxide for enhanced adsorption in water treatment." Chemical Engineering Journal, vol. 439, 2022, 135542, ISSN 1385-8947.

V. Sanderyd (2018). "Novel Hybrid Nanomaterials—Combining Mesoporous Magnesium Carbonate and Metal-Organic Frameworks." UPPSALA Universitet.

Osama Abuzalat et al. (2018). Sonochemical fabrication of Cu(II) and Zn(II) metal-organic framework films on metal substrates, *Ultrasonics Sonochemistry,* vol. 45, 2018, pp. 180-188, ISSN 1350-4177.

Mahboobeh Tanhaei, et al. , (2019), Energy-efficient sonochemical approach for the preparation of na- nohybrid composites from graphene oxide and metal-organic framework, Inorganic Chemistry Commu-nications, vol. 102, 2019, pp. 185-191, ISSN 1387-7003.

* cited by examiner

UiO-66

ZIF-8

ZIF-4

SINGLE-WALLED CARBON NANOTUBE

MULTI-WALLED CARBON NANOTUBE

SEPARATION OF FISSION PRODUCTS IN A MOLTEN SALT REACTOR VIA ADSORBENT FRAMEWORKS

RELATED APPLICATIONS

The present application relates and claims priority to U.S. Provisional Application No. 63/586,832, filed on Sep. 29, 2023, which is hereby incorporated by reference in its entirety.

TECHNICAL FIELD

The described examples relate generally to systems and methods for removing fission products from a molten salt reactor, and in particular, to systems and methods for removing fission products from a molten salt using metal-organic frameworks in a molten salt reactor.

BACKGROUND

Molten salt reactors (MSRs) offer an approach to nuclear power that utilizes molten salts as their nuclear fuel in place of the conventional solid fuels used in light water reactors. Advantages include efficient fuel utilization and enhanced safety (largely due to replacing water as a coolant with molten salt). In an MSR, fission reactions occur within a molten salt composition housed within a reactor vessel. The fission of uranium-235 (U-235) produces a spectrum of fission products, including molybdenum-99 (Mo-99), iodine-131 (I-131) and xenon-133 (Xe-133). Once produced, the Mo-99 atoms and other fission products are present in the irradiated molten fuel salt as various different species. For example, some Mo-99 atoms may be a solid (alone or in a compound) suspended in the molten fuel salt (e.g., $Mo^0$, $MoF_3$, $MoF_4$, $MoF_5$, etc.), some may be dissolved in the molten fuel salt ($Mo^{+6}$, $MoF_{6^-}$), some may be a gaseous molybdenum hexafluoride, and some may plate out as a metal.

For fission products that remain in the molten fuel salt, there remains a need for an improved system and method to remove the fission products from the irradiated molten fuel salt while the molten salt reactor is online.

SUMMARY

In one example, a system is disclosed. The system includes a molten salt reactor system comprising a molten salt, a reactor core, and an extraction system. The extraction system is coupled to the molten salt reactor system configured to receive a flow of molten salt comprising fission products produced in the reactor core. The system further includes an absorbent framework extending from the extraction system into the molten salt by an attachment rod. The attachment rod is configured to facilitate removal of the absorbent framework from the molten salt. The absorbent framework comprises a temperature resistant cartridge configured to house an absorbent composition and enable flow of the molten salt therethrough. The absorbent composition is configured to capture fission products from the molten salt by binding to the fission products via intermolecular force interaction between the absorbent composition and the fission products.

In another example, the absorbent composition is a metal-organic framework.

In another example, the intermolecular forces comprise one or more force interactions between the metal-organic framework and the fission products comprising ion-ion interaction, Van der Waals forces, dipole-dipole forces, ion-dipole interactions, and/or hydrogen bonding.

In another example, the absorbent composition comprises carbon-nanotubes comprising binding sites with an affinity to fission products.

In another example, the absorbent composition comprises microspheres formed or coated with a material having an affinity to fission products.

In another example, the metal-organic framework compound is a porous structure with a plurality of pores of a size to allow the fission products to penetrate the metal-organic framework compound; and the metal-organic framework compound is configured to have an affinity to the fission products by having an electrostatic charge opposite to that of the fission products.

In another example, the metal-organic framework is temperature and corrosion resistant.

In another example, the metal-organic framework compound comprises UiO-66, ZIF-4, or ZIF-8.

In another example, the metal-organic framework is UiO-66 configured to be temperature resistant up to 600° C.

In another example, the UiO-66 has a crystal structure and is synthesized using thermal solvolysis.

In another example, the UiO-66 has an amorphous glass structure and is synthesized using vapor diffusion.

In another example, the UiO-66 has an amorphous powder structure and is synthesized using sonication.

In another example, the metal-organic framework is bound to a temperature resistant substrate via sonication.

In another example, the temperature resistant substrate is selected from a group consisting of a metal mesh wire frame, rebar, graphene, copper wire, nickel sponge, and graphite.

In another example, wherein the molten salt is LiF—$BeF_2$—$UF_4$ and the fission products comprise molybdenum-99.

In another example, the extraction system is a bypass coupled to a molten salt loop including a bypass valve operable to selectively facilitate flow of the molten salt to the extraction system.

In another example, the molten salt loop is configured to facilitate circulation of the molten salt comprising fissile material through the reactor core of the molten salt reactor system; and wherein the reactor core is operable to facilitate fission reaction of the fissile material thereby producing fission products within the molten salt.

In another example, an extraction system is disclosed. The extraction system includes a pipe coupled to a molten salt loop of a molten salt reactor system. The pipe houses an attachment rod coupled to a cartridge and the attachment rod is configured to submerge the cartridge into a flow of molten salt of the molten salt loop. The cartridge is configured to house an absorbent composition operable to capture fission products from the flow of molten salt.

In another example, the cartridge includes an outer wall and an inner wall with a mesh structure therebetween configured to enable the flow of molten salt to pass through the mesh structure and contact the absorbent composition.

In another example, the mesh structure defines an inner opening to reduce impedance on the flow of molten salt.

In another example, the pipe includes a lower assembly having an in-line portion configured to receive the flow of molten salt, and a lower assembly pipe portion extending traverse from the in-line portion and defining a lower channel therethrough. The pipe may further include an upper assembly fluidically coupled with the lower assembly and having an upper assembly pipe portion defining an upper channel therethrough and cooperating with the lower channel to define an attachment rod channel of the pipe. The attachment rod is disposed fully within the attachment rod channel. The cartridge is attached to a lower portion of the attachment rod. The pipe may further include an actuation mechanism operatively coupled to the attachment rod and configured to move the attachment rod axially within the attachment rod channel and configured to move the cartridge into and out of the flow of molten salt.

In another example, the attachment rod includes a stop feature proximal to the lower portion of the attachment rod. The stop feature is configured to define a maximum extent to which the absorbent framework in the flow of molten salt.

In another example, the absorbent composition comprises a metal-organic framework. The metal-organic framework compound is a porous structure with a plurality of pores of a size to allow the fission products to penetrate the metal-organic framework compound. The absorbent composition is configured to capture fission products from the molten salt by binding to the fission products via intermolecular force interaction between the absorbent composition and the fission products. The intermolecular force interactions include ion-ion interaction, Van der Waals forces, dipole-dipole forces, ion-dipole interactions, and/or hydrogen bonding.

In another example, the absorbent composition comprises carbon-nanotubes comprising binding sites with an affinity to fission products.

In another example, the absorbent composition comprises microspheres formed or coated with a material having an affinity to fission products.

In another example, the metal-organic framework is temperature up to 600° C. and corrosion resistant.

In another example, the metal-organic framework is UiO-66 with a crystal structure synthesized by thermal solvolysis, UiO-66 with an amorphous glass structure synthesized by vapor diffusion, or UiO-66 with an amorphous powder structure synthesized by sonication.

In another example, a method for synthesizing a temperature resistant metal-organic framework is disclosed. The method includes preparing a first solution by combining an organic ligand source and a metal source. The method further includes conducting a synthesis technique on the first solution selected from a group including thermal solvolysis, sonication, and vapor diffusion. The method further includes vacuum filtering the mixture. The method further includes drying the mixture to produce a precipitate comprising the temperature resistant metal-organic framework.

In another example, the organic ligand source includes a solution of 2-aminoterephthalic acid and dimethylformamide, and the metal source includes zinc nitrate.

In another example, thermal solvolysis includes heating the mixture within an autoclave at a first temperature for a first length of time and subsequently heating the mixture at a second temperature for a second length of time and cooling the mixture.

In another example, the second length of time is at least twice the first length of time and wherein the first temperature is less than the second temperature.

In another example, the temperature resistant metal-organic framework is UiO-66; and the UiO-66 is a crystal structure operable to withstand temperatures up to 600° C.

In another example, vapor diffusion includes placing the mixture in an uncovered vessel and placing the mixture in a larger vessel; adding triethylamine to the larger vessel; and allowing the uncovered vessel to rest undisturbed for a length of time.

In another example, the temperature resistant metal-organic framework is UiO-66, and the UiO-66 is an amorphous glass structure operable to withstand temperatures up to 600° C.

In another example, further including adhering the temperature resistant metal-organic framework to a temperature resistant substrate via sonication of the mixture with the temperature resistant substrate.

DETAILED DESCRIPTION

Figure 1:
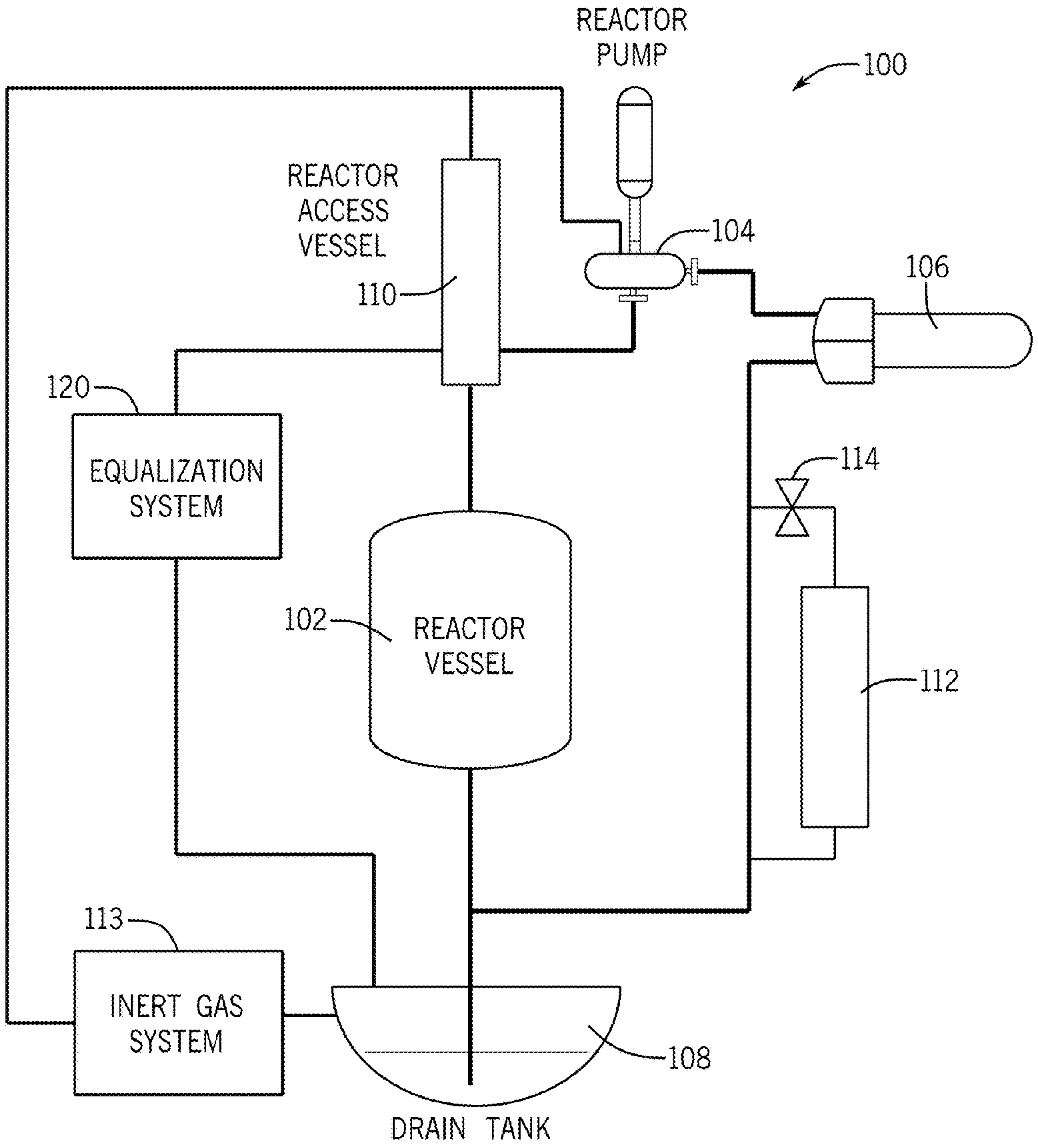
FIG. 1 illustrates an example molten salt reactor system.

The description that follows includes sample systems, methods, and apparatuses that embody various elements of the present disclosure. However, it should be understood that the described disclosure may be practiced in a variety of forms in addition to those described herein.

The following disclosure relates generally to molten salt reactor systems, such as those that produce fission products, and systems and methods for removing such fission products out of the molten salt reactor system. A molten salt reactor system may broadly include a collection of components configured to circulate a molten fuel salt along a fuel salt loop. For example, a molten salt reactor system may operate by circulating a molten fuel salt between a reactor vessel (within which fission occurs) and a heat exchanger (for the removal of heat from the fuel salt). However, in some examples, the molten salt reactor is a pool-type reactor with the molten salt disposed within a main reactor vessel, including other components such as the reactor core.

Fissile nuclides, e.g., uranium-235, uranium-233, and plutonium-239, in the molten fuel salt undergo fission in the reactor vessel of a molten salt reactor to yield fission products, some of which may subsequently decay or otherwise be used to yield useful radionuclides. Non-limiting examples of radioactive elements that may be produced in a molten salt reactor include molybdenum-99, actinium-225, iodine-131, xenon-133, hydrogen-3, nitrogen-13, carbon-14, oxygen-15, fluorine-18, gallium-67, gallium-68, selenium-75, krypton-81m, strontium-89, yttrium-90, technetium-99m, indium-111, iodine-123, iodine-125, samarium-153, erbium-169, and radium-223, which are thereafter present in the irradiated molten fuel salt. The molten salt loop (or the main reactor vessel) carries the irradiated molten fuel salt from the reactor vessel to the heat exchanger, and the fuel salt loop may include one or more other components, such as, but not limited to, a reactor access vessel, a fuel pump, and a drain tank. The amount of fission products in the molten fuel salt increases over time, and as such, it may be necessary to remove one or more of the fission products from the molten fuel salt to decrease the amount of fission products in the molten fuel salt. Additionally, at least some of the fission products, once removed from the molten salt reactor system, may be used in various applications.

Conventional liquid-fueled molten salt reactors allow for the buildup of fission products in the molten fuel salt until the molten fuel salt is removed from the molten salt reactor system. The buildup of fission products in the molten fuel salt can inhibit the fission rate of the molten fuel salt through processes such as neutron capture, necessitating an earlier removal of the molten fuel salt and hindering the efficiency of the conventional molten salt reactor system.

To mitigate these and other challenges, the molten salt reactor system of the present disclosure includes an online extraction system to extract the fission products from the molten fuel salt in the molten salt reactor system, such that any fission product buildup issues are lessened or eliminated. The various extraction systems disclosed herein may utilize a variety of absorbent and adsorbent compositions housed within a temperature resistant cartridge (often collectively referred to as an absorbent framework or simply framework) to capture fission product atoms and molecules dissolved, suspended, or otherwise present in the molten fuel salt. As described herein, the various absorbent compositions may also have adsorbent properties, such that they are operable to absorb fission products, adsorb fission products, and/or both adsorb and absorb fission products. For clarity, this functionality is contemplated even if, for conciseness, only absorption is specifically described. The absorbent compositions may include metal-organic frameworks, such as UiO-66, ZIF-4, or ZIF8. The absorbent compositions may also include carbon nanotubes or absorbent microspheres. Further, the absorbent frameworks may include a cartridge configured to house the absorbent composition in a manner to allow the molten fuel salt to flow through the cartridge and consequently the absorbent composition, which capture the fission products from the molten fuel salt. Further, the extraction system may include one or more mechanisms for facilitating inclusion of the absorbent framework into the molten salt and remove of the absorbent framework from the molten salt, thereby enabling fission product removal. Following extraction, the fission products may be separated and collected from the absorbent composition utilizing known methods. Thus, the extraction system both lessens the burden fission products have on the molten salt reactor system and provide for the collection of valuable fission products (e.g., molybdenum-99).

Additionally, the example extraction system may also include one or more pipes off of the main molten salt reactor loop (i.e., the reactor-reactor access vessel-reactor pump-heat exchanger-reactor vessel loop) or bypasses. A valve may selectively control flow of molten salt to the extraction system, and, if multiple pipes in the extraction system, additional valves may be utilized to control flow through each individual pipe. Also, where the extraction system has more than one pipe, the multiple pipes may run in parallel to one another. Further, as shown in FIGS. 2-3, each pipe of the fission product removal system may define one or more openings that allow a device, such as a cartridge or any other device capable of holding the absorbent material while being dipped into the molten fuel salt to capture the fission products. However, in some examples, the molten salt reactor system is a pool-type reactor with the molten salt disposed within a main reactor vessel housing functional component of the molten salt reactor system. In these embodiments, the various example extraction systems may be equipped directly onto the main reactor vessel, such that the various absorbent frameworks described herein make contact with the molten salt. Thus, while the various examples described herein reference a molten salt loop, one or ordinary skill in the art will appreciate that the various extraction systems may be employed onto a main reactor vessel, rather than a molten salt loop, where a pool-type reactor it used.

In many embodiments, the absorbent material may be metal-organic frameworks (sometimes abbreviated as "MOFs") configured to capture the fission products. Metal-organic frameworks are an organic-inorganic porous extended structures that have sub-units arranged in a pattern, and may be one-dimensional, two-dimensional, or three-dimensional. Metal-organic frameworks include pores that can hold fission products, and certain metal-organic frameworks can be synthesized so that they have an affinity for certain fission products and include binding sites so the fission product binds to the metal-organic frameworks. For example, in one embodiment, a certain metal-organic framework structure may have an affinity for molybdenum-99 (Mo-99), such that the Mo-99 atoms may be captured in the pores of the metal-organic framework, which removes Mo-99 from the molten salt. If desired, various other strategies may be used to increase the capture efficiency of the Mo-99 from the molten salt. For example, the metal-organic framework structure may be impregnated with a chemical species that preferentially binds to Mo-99, such that the chemical species resides within the pores of the metal-organic framework. Alternatively, the surface of the metal-organic framework may be decorated with a chemical species that preferentially bind with molybdenum, such that the rate of Mo-99 capture at the surface of the metal-organic framework structure is enhanced. Additionally, the metal-organic frameworks may be synthesized utilizing rational selection of appropriate synthesis conditions with nodes and linkers, it is possible to produce MOFs of desired surface area, pore size, functionality, and topology. Of course, the present invention contemplates combinations of these strategies as well.

Notably, while metal-organic frameworks may be well known and understood by those of ordinary skill in the art, known metal-organic frameworks may not be fit for inclusion in a molten salt reactor system. More specifically, in order for a metal-organic framework (or any absorbent material) to be capable of capturing fission products from a flow of molten salt of a molten salt reactor system, it must be able to withstand high temperatures (e.g., about 600° C.), be corrosion resistant to survive attacks from fluorine anions, and have an affinity for a particular radioisotope. Such desired characteristics may be accomplished by synthesizing known metal-organic frameworks with novel techniques to produce unique structures granting such desired characteristics. For example, a metal-organic framework may be synthesized utilizing thermal solvolysis under time and temperature conditions to produce a crystal structure with increased temperature resistant properties.

In certain non-limiting embodiments, the metal-organic frameworks contemplated by the invention may be doped with either sulfur or tungsten in order to enhance capture of the Mo-99. When the dopant is sulfur, for example, the sulfur may be present at a concentration of about 5%, about 10%, about 15%, about 20% or even about 25%, with the understanding that pairs of these percentage values can be used as endpoints that define a range that is expressly contemplated by the invention. In certain embodiments, one atom of sulfur is present per unit cell of the metal-organic framework. Generally, the sulfur may be introduced into the metal-organic framework using a precursor compound that contains sulfur, provided that the precursor compounds have sufficiently small molecular sizes to be able to penetrate the pore structure of the metal-organic frameworks. For instance, in certain embodiments, the sulfur precursor compound may be an alkyl thiol, sulfide, disulfide, thioester, or sulfoxide. In other embodiments, the sulfur precursor compound may be a sulfur-containing amino acid, such as 1-cysteine. Of course, combinations of such sulfur precursors are also expressly contemplated by the invention. It should be noted, however, that in certain embodiments, it is advantageous to use sulfur precursor compounds that do not include oxygen atoms or only one oxygen atom at most, in order to minimize the undesirable generation of oxygen in the molten salt. For this reason, in certain embodiments, sulfites and sulfates are not used as sulfur precursor compounds.

In addition to or instead of sulfur, the metal-organic frameworks may be doped with tungsten. In certain preferred embodiments, the tungsten is present as nanoparticles of metallic tungsten that are introduced into the metal-organic framework using a liquid phase infusion process. Tungsten nanoparticles may be commercially obtained from Cospheric LLC in Goleta, CA. Alternatively, the tungsten may be introduced into the pores of a metal-organic framework by dissolving a tungsten salt into an aqueous medium and then contacting the metal-organic framework with the aqueous medium. Non-limiting examples of soluble tungsten salts contemplated by the invention include tungsten (II) chloride and sodium tungstate. In other embodiments, the tungsten may be evaporated onto the surface of the metal-organic framework using techniques such as e-beam evaporation, thermal evaporation, sputter deposition, and the like.

For other radioactive isotopes of interest, the same or analogous doping strategies may be used to enhance capture of the radioactive isotopes by the metal-organic frameworks. For example, the capture efficiency of gallium-67 may be enhanced by using sulfur-doped metal-organic frameworks as discussed herein. However, this invention also expressly contemplates using other types of dopants analogously to enhance capture other radioactive isotopes.

Useful metal-organic frameworks (MOFs) contemplated by the invention include UiO-66 and zeolitic imidazolate frameworks (ZIFs), which are a class of metal-organic frameworks that are topologically isomorphic with zeolites. Currently, there are over 100 ZIF compounds reported in the literature. In general, suitable metal-organic frameworks include those that (1) have a pore size that permits capture of the Mo or other radioactive isotope of interest in the molten salt reactor; and (2) can withstand the high temperature, reactive conditions found in a molten salt reactor. For example, some of the Mo-99 produced in a molten salt reactor system may exists as molybdenum hexafluoride. Thus, in certain preferred embodiments, the MOFs have pore sizes that permit $MoF_6$ to diffuse into the metal-organic framework. Useful MOFs of the invention include those that have a melting point of at least 650° C., 700° C., 750° C. or 800° C. Particularly useful ZIF compounds include ZIF-4 and ZIF-8.

The metal-organic frameworks utilized in a molten salt reactor system may include certain additional properties, such as being heat resistant (up to 800 degrees Celsius) and corrosion resistant. Further, the metal-organic frameworks may be built or added on top of another metal (e.g., stainless steel), to provide structure in the molten salt reactor system. For instance, the metal-organic frameworks may be sintered onto a high-surface-area metal support that is subsequently immersed into the molten salt to capture Mo-99 or another radioactive isotope of interest in the molten salt. In other embodiments, the metal-organic frameworks may be packed into a cartridge so that the metal-organic frameworks are prevented from passing through the cartridge but the molten fuel salt can flow through the cartridge to facilitate fission product capture. When the metal-organic frameworks are ZIFs, the Mo-99 or other radioactive isotope of interest may be recovered from the ZIFs by dissolving the ZIFs under acidic or alkaline conditions.

The absorbent compositions of the present invention may also include carbon nanotubes configured to capture fission products. Certain carbon nanotube structures may include large pores that can hold fission products, and certain carbon nanotubes may have, or can be made to have, an affinity for certain fission products and include binding sites so the fission product binds to the carbon nanotube structure. For example, in one embodiment, a certain carbon nanotube structure containing tungsten or sulfur at the binding site may have an affinity for Mo-99, such that the Mo-99 atoms may bind to the binding site in the pore of the carbon nanotube structure, which removes Mo-99 from the molten salt.

The absorbent composition of the present invention may also include microspheres formed or coated with materials having an affinity to fission products. For example, the various MOF compositions described herein may be grown onto or otherwise adhered to a surface of the microspheres. The microsphere structures may be one or more microspheres clustered together within a single porous structure configured to enable the microspheres to contact the molten salt while preventing them from escaping the porous structure. In this example, fission products may adsorb or absorb onto the microspheres via chemical interaction with the MOF composition. In some embodiments, the microspheres are made with a material that has an affinity for certain fission products, or may be coated with a second material that has an affinity for certain fission products. The fission products adsorb onto the microsphere structure surface. For example, in one embodiment, a certain microsphere structure may be made of a material that facilitates Mo-99 adsorption, such that the Mo-99 atoms may adsorb onto the surface of the microsphere structure, which removes Mo-99 from the molten salt. As another example, in one embodiment, a cluster of microspheres may have MOFs with an affinity to Mo-99 grown or otherwise adhered to the surface of the microspheres, such that the Mo-99 atoms may adsorb onto the surface of the microsphere structure, which removes Mo-99 from the molten salt.

Turning to the drawings, for purposes of illustration, FIG. 1 depicts a schematic representation of an example molten salt reactor system 100. The molten salt reactor system 100 may implement and include the extraction system, and implement any of the functionalities of each described herein. As will be understood and appreciated, the example shown in FIG. 1 represents merely one example configuration of a molten salt reactor system 100 in which such extraction systems may be utilized. It will be understood that the extraction systems described herein may be used in and with substantially any other configuration of the molten salt reactor, as contemplated herein.

In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be $LiF—BeF_2—UF_4$, though other compositions of fuel salts may be utilized as fuel salts within the reactor system 100 (e.g., $LiF—BeF_2—UF_4$). The fuel salt within the system 100 is heated to high temperatures (about 600-700° C.) and melts as the system 100 is heated. In several embodiments, the molten salt reactor system 100 includes a reactor vessel 102 including a reactor core where the nuclear fission reactions occur within the molten fuel salt, a fuel salt pump 104 that pumps the molten fuel salt to a heat exchanger 106, such that the molten fuel salt re-enters the reactor vessel 102 after flowing through the heat exchanger 106, and piping in between each component. The molten salt reactor system 100 may also include additional components, such as, but not limited to, a drain tank 108, a reactor access vessel 110, an inert gas system 113, and an equalization system 120. The drain tank 108 may be configured to store the fuel salt once the fuel salt is in the reactor system 100 but in a subcritical state, and also acts as storage for the fuel salt if power is lost in the system 100. The reactor access vessel 110 may be configured to allow for introduction of small pellets of uranium fluoride ($UF_4$) and/or beryllium (Be) to the system 100 as necessary to bring the reactor to a critical state, compensate for depletion of fissile material, and/or manage fuel salt chemistry.

In several examples, the molten salt reactor system 100 may include an inert gas system 113 to provide inert gas to a head space of the drain tank 108, among other functions. The inert gas system 113 may further relieve inert gas from the head space of the drain tank 108 as needed. The inert gas system 113 is therefore operable to maintain pressurized inert gas in the head space of the drain tank 108 that is sufficient to substantially prevent the flow of molten fuel salt into the drain tank during normal operations. For example, with the head space of the drain tank 108 pressurized by the inert gas system 113, molten salt may generally circulate between the reactor vessel 102 and the heat exchanger 106 without substantially draining into the drain tank 108. As described herein, the inert gas system 113 may be configured to supply inert gas to the head space of various other components of the molten salt reactor system 100, such as to the head space of the reactor access vessel 110, to the seal of reactor pump 104, among other components. Upon the occurrence of a shutdown event, the inert gas system 113 may cease providing inert gas to the head space of the drain tank 108, and other components to which the system 113 supplies inert gas.

The molten salt reactor system 100 may further include an equalization system 120 that is operable to equalize the pressure between the head space of the drain tank 108 and the reactor vessel 102 upon the occurrence of a shutdown event. For example, during normal operation a pressure differential exists between the head space of the drain tank 108 and the reactor vessel 102. Such pressure differential prevents or impedes the draining of the fuel salt into the drain tank 108. In this regard, the equalization system 120 may be operable to fluidically couple (via opening one or more valves) the head space of the drain tank 108 and the reactor vessel 102 to reduce or eliminate the pressure differential, thereby allowing the fuel salt to readily flow into the drain tank upon the shutdown event. The equalization system 120 may include numerous redundances and/or bypasses in order to facilitate a fail-safe or walk-away safe operation with respect to depressurization of the system 100.

Additionally, the system 100 may include an extraction system 112 and a filtration valve 114 that extend off of the main loop (i.e., the reactor vessel 102—reactor access vessel 110—reactor pump 104—heat exchanger 106—reactor vessel 102 loop) and return to the main loop at a point downstream. In several embodiments, the extraction system 112 is a bypass off the molten salt loop of the molten salt reactor system 100 and is provided selective flow of molten salt comprising fission products by the filtration valve 114. Although FIG. 1 shows the fission extraction system 112 connected to piping in between the heat exchanger 106 and reactor vessel 102, other embodiments of the fission product removal system 112 and molten salt reactor system 100 may include the extraction system 112 at different points on the main loop of the system 100, or may be utilized with a specific component of the system 100 (e.g., attached to the reactor access vessel 110). One of ordinary skill in the art will appreciate that FIG. 1 illustrates just one of many placements of the extraction system 112. For example, the extraction system 112 may be positioned above the reactor vessel 102, such that it receives molten salt immediately following fission reaction. This may be advantageous as the molten salt may contain a higher density of fission products. The filtration valve 114 may be remotely controlled or manually controlled, and opens to allow for molten fuel salt to flow into the extraction system 112. Additionally, closing the filtration valve 114 may allow for the molten fuel salt to flow out of the extraction system 112 so that the absorbent framework may be safely removed from the fission product removal system 112. In one further embodiment, an inert gas may be pumped into the extraction system 112 after the filtration valve 114 is closed to push the remaining molten fuel salt out of the extraction system 112.

Figure 2A:
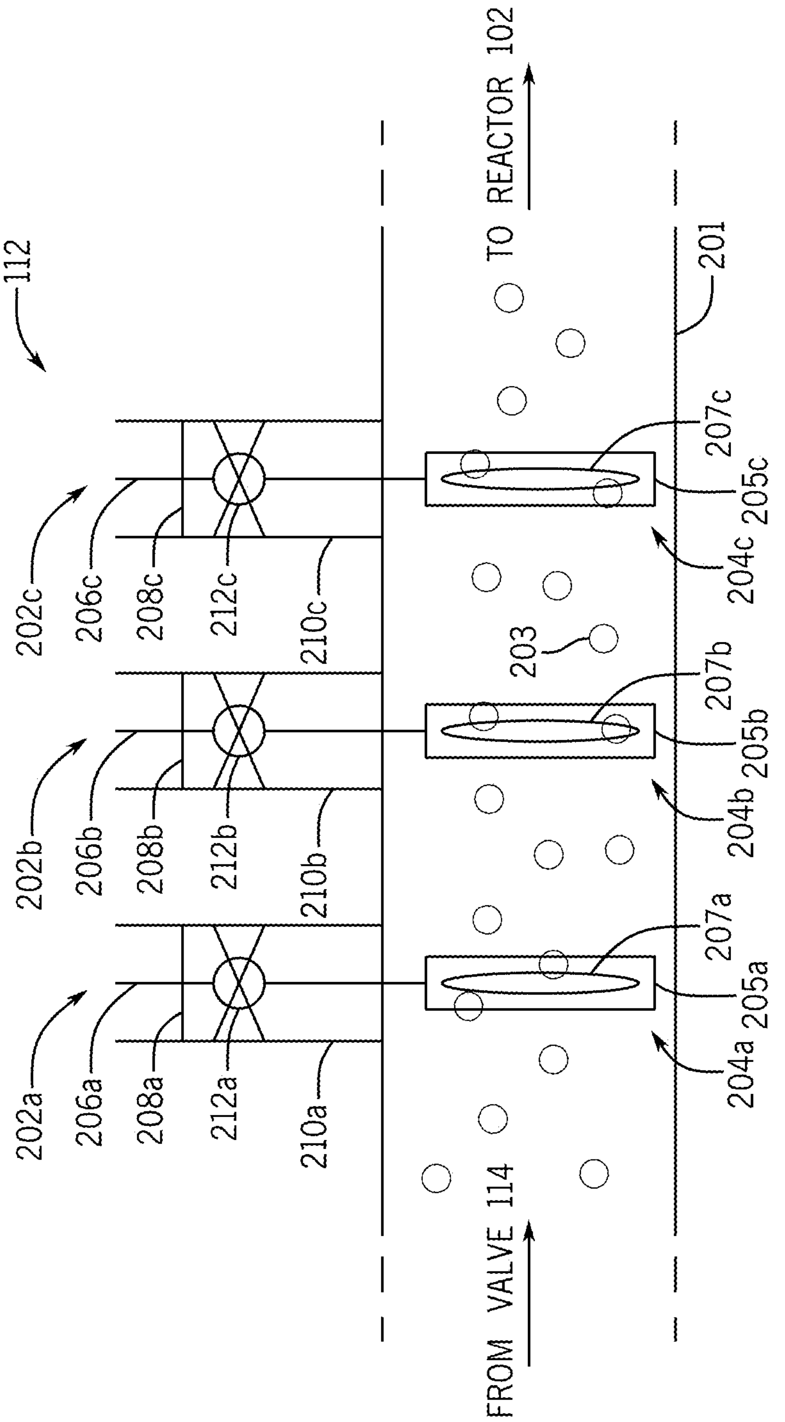
FIG. 2A illustrates an example extraction system.
Figure 2B:
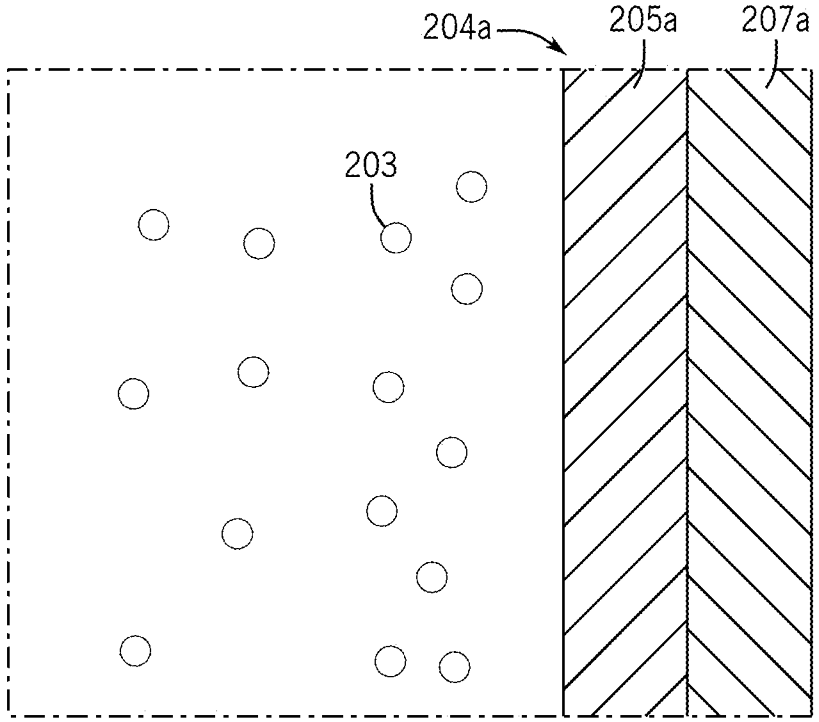
FIG. 2B illustrates an example absorbent framework of FIG. 2A.
Figure 2C:
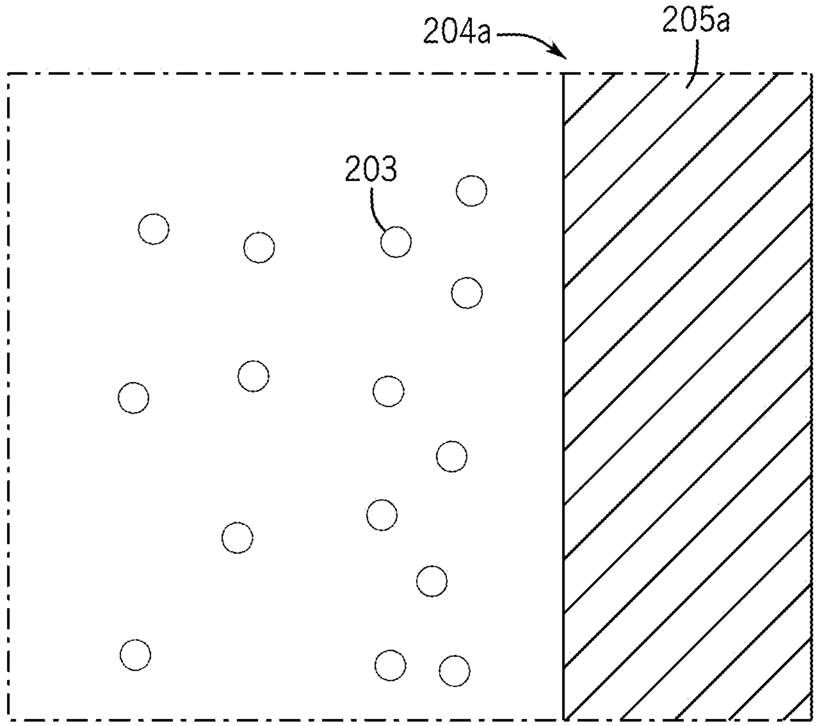
FIG. 2C illustrates another example absorbent framework of FIG. 2A.
Figure 3:
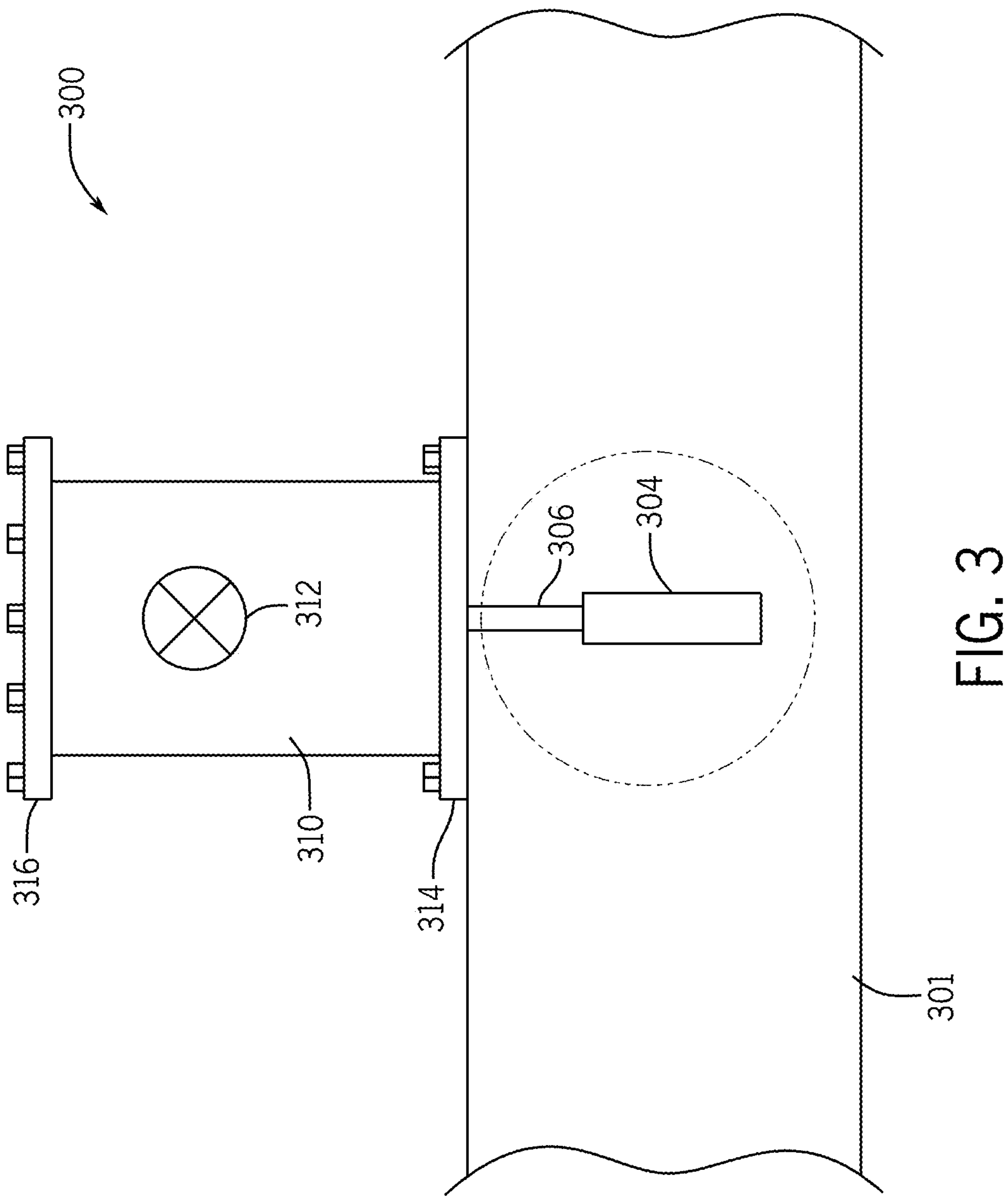
FIG. 3 illustrates another example extraction system.

Turning now to FIGS. 2A-2C, an example extraction system 112 is shown, according to one embodiment of the present disclosure. In many embodiments, the extraction system 112 may include a pipe 201 having molten fuel salt including fission products 203 flowing through the pipe 201 (i.e., the filtration valve 114 is open), and may also include one or more capture systems 202 (as shown in FIG. 2, capture systems 202*a*, 202*b*, and 202*c*) connected to the pipe 201. Other embodiments of the present disclosure may include one capture system 202, or a plurality of capture systems 202 (e.g., 2, 4, 5, etc.). The extraction system 112 may generally include any of a variety of components and subassemblies that cooperate to allow for the absorbent framework to be moved into and out of a flow of a molten salt.

In several embodiments, with reference to FIG. 2A, each capture system 202 includes an absorbent framework 204*a*, 204*b*, 204*c*, an attachment rod 206*a*, 206*b*, 206*c*, and a salt barrier 208*a*, 208*b*, 208*c*. The capture systems 202*a*, 202*b*, 202*c* may refer to the mechanism of the extraction system 112 that enables the absorbent framework 204*a*, 204*b*, 204*c* to be inserted into and out of the flow of molten salt, such that they may contact the fission products 203. Each absorbent framework 204*a*, 204*b*, 204*c* may include a cartridge 205*a*, 205*b*, 205*c* configured to house an absorbent composition 207*a*, 2076, 207*c*. The cartridges 205*a*, 205*b*, 205*c* enable molten salt to flow therethrough and contact the absorbent compositions 207*a*, 207*b*, 207*c* thereby facilitating captures of fission products 203 via absorption or adsorption. For example, the cartridge 205*a*, 205*b*, 205*c* may be a temperature resistant mesh enclosure sized to enable passage of molten salt while preventing the absorbent composition 207*a*, 2076, 207*c* from exiting its respective cartridge 205*a*, 205*b*, 205*c*. In many embodiments, the attachment rod 206*a*, 206*b*, 206*c* is attached to the absorbent framework 204*a*, 204*b*, 204*c* at one end and includes the salt barrier 208*a*, 208*b*, 208*c* attached near the other end of the attachment rod 206*a*, 206*b*, 206*c*. In at least one embodiment, the extraction system 112 also includes one or more capture system pipes 210*a*, 210*b*, 210*c*, and each of the one or more capture system pipes 210*a*, 210*b*, 210*c* includes a capture system valve 212*a*, 212*b*, 212*c*. The capture system 202*a*, 202*b*, 202*c* may extend through the capture system pipe 210*a*, 210*b*, 210*c* and, when in an open position, extend through the capture system valve 212*a*, 212*b*, 212*c* and into the pipe 201. Specifically, the absorbent framework 204*a*, 204*b*, 204*c* and a portion of the attachment rod 206*a*, 206*b*, 206*c* pass through the capture system pipe 210*a*, 210*b*, 210*c*, through the open capture system valve 212*a*, 212*b*, 212*c*, and into the pipe 201. In many embodiments, the salt barrier 208*a*, 208*b*, 208*c* may have a diameter substantial equal to that of the capture system pipe 210*a*, 210*b*, 210*c*, so that it cannot extend through the capture system valve 212*a*, 212*b*, 212*c* and act as a barrier for the molten fuel salt coming through the capture system pipe 210*a*, 210*b*, 2120*c*. For clarity, the salt barrier 208*a*, 208*b*, 208*c* may be of a size to enable vertical movement within the capture system pipe 210*a*, 210*b*, 210*c* while preventing molten salt from exiting the extraction system 112 while the capture system valve 212*a*, 212*b*, 212*c* is in an open position. Additionally, the salt barrier 208*a*, 208*b*, 208*c* may be of a size too large to fit through an opening of the capture system valve 212*a*, 212*b*, 212*c*, such that the attachment rod 206*a*, 206*b*, 206*c* is prevented from extending too far into the pipe 201. In some embodiments, the salt barrier 208*a*, 208*b*, 208*c* may have some thickness such that the molten fuel salt does not leak through the salt barrier 208*a*, 208*b*, 208*c*. Additionally, inert gas may be pumped into the capture system pipe 210*a*, 210*b*, 210*c* to create a pressure differential so that the molten fuel salt is prevented from flowing through the capture system pipes 210*a*, 210*b*, 210*c*.

In multiple embodiments, the capture system valve 212*a*, 212*b*, 212*c*, when in the open position, may have an area or volume large enough to pass the absorbent framework 204*a*, 204*b*, 204*c* and attachment rod 206*a*, 206*b*, 206*c* through the capture system valve 212*a*, 212*b*, 212*c*. In some embodiments, the capture system valve 212*a*, 212*b*, 212*c* may be a ball valve or any other type of valve that allows the absorbent framework 204*a*, 204*b*, 204*c* to access the pipe 201. The capture system valve 212*a*, 212*b*, 212*c* cannot close while the absorbent framework 204*a*, 204*b*, 204*c* is in the pipe 201. Once the extraction system 202*a*, 202*b*, 202*c* is removed from the pipe 201, capture system valve 212*a*, 212*b*, 212*c*, and capture system pipe 210*a*, 210*b*, 210*c*, the capture system valve 212*a*, 212*b*, 212*c* is closed to prevent molten fuel salt and fission products 203 from leaving the system 112 via capture system pipe 210.

In several embodiments, the absorbent framework 204*a*, 204*b*, 204*c* includes a temperature resistant cartridge 205*a*, 205*b*, 205*c* configured to house the absorbent composition 207*a*, 207*b*, 207*c*. The cartridge 205*a*, 205*b*, 205*c* is configured to enable passage of molten salt therethrough, such that the absorbent composition 207*a*, 2076, 207*c* may contact fission products 203 and be captured therein. Fission product capture may be facilitated by absorption or adsorption of fission products onto and/or in the absorbent composition 207*a*, 2076, 207*c*. In several embodiments, cartridges 205*a*, 205*b*, 205*c* are temperature and corrosion resistant. For example, cartridges 205*a*, 205*b*, 205*c* may be able to withstand temperatures of about 700° C. and may be able to withstand attack from fluorine ions. I several embodiments, cartridges 205*a*, 205*b*, 205*c* are configured to withstand temperatures between 550° C. and 750° C. However, one of ordinary skill in the art will appreciate that, depending on the material selected, the cartridges 205*a*, 205*b*, 205*c* may be configured to resist temperatures greater than 750° C. The absorbent composition may be a metal-organic framework, carbon nanotube, absorbent microsphere, or any combination thereof. The temperature resistant cartridge and the absorbent composition may be collectively referred to as the absorbent framework 204. In some embodiments, the temperature resistant cartridge is primarily made of the absorbent composition (see FIG. 2C). In some embodiments, the absorbent composition is grown or adhered directly to the temperature resistant cartridge. In other embodiments, the absorbent composition is adhered to a temperature resistant substrate and then subsequently placed within the temperature resistant cartridge of the absorbent framework 204.

FIG. 2B illustrates an example absorbent framework 204*a* of FIG. 2A. For clarity, while FIG. 2B illustrates a detailed view of the absorbent framework 204*a* of FIG. 2A, such a detailed view is representative of all absorbent frameworks 204*a*, 204*b*, 204*c* of FIG. 2A. In several embodiments, the absorbent framework 204*a* includes a temperature resistant cartridge 205*a*, which forms the outer layer of the framework 204*a*, and includes an absorbent composition 207*a*, which forms an inner layer of the framework 204*a*. The temperature resistant cartridge 205*a* may be configured to enable passage of fission products 203, such that they may contact absorbent composition 207*a* as the molten salt flows throughout the molten salt loop of system 100. As discussed herein, absorbent composition 207*a* is operable to capture fission products 203 from the flow of molten salt via absorption and/or adsorption. As such, fission products 203 may flow through cartridge 205*a* and into absorbent composition 207*c*.

FIG. 2C illustrates another example absorbent framework of FIG. 2A. For clarity, while FIG. 2C illustrates a detailed view of the absorbent framework 204*a* of FIG. 2A, such a detailed view is representative of all absorbent frameworks 204*a*, 204*b*, 204*c* of FIG. 2A. In some embodiments, absorbent framework 204*a* includes only the temperature resistant cartridge 205*a*. In these embodiments, the temperature resistant cartridge 205*a* may still be configured to capture fission products 203 via absorption and/or adsorption by being composed of or coated with the various absorbent compositions described herein. For example, the temperature resistant cartridge 205*a* may be formed by absorbent frameworks. As another example, the temperature resistant cartridge 205*a* may be coated with absorbent microspheres or metal-organic frameworks. In several embodiments, metal-organic frameworks are grown directly onto temperature resistant cartridge 205*a*.

Turning now to FIG. 3, which illustrates another example extraction system 300. The example extraction system 300 may be substantially analogous to that of FIG. 2 and include a pipe 301, a capture system pipe 310, a capture system valve 312, an attachment rod 306, and an absorbent framework 304. For clarity, FIG. 3 illustrates a semi-transparent view of the pipe 301, such that the absorbent framework 304 is visible as being submerged in the flow of molten salt. Similarly, the extraction system 300 may be utilized to capture and remove fission products from the flow of molten salt, which may be present in the molten salt following fission reaction within the reactor vessel 102 or reactor core of the example MSR system 100. The pipe 301 may be connected to a molten salt loop of a molten salt reactor system or may be a bypass from piping connecting various components of a molten salt reactor system (e.g., MSR system 100). In some embodiments, pipe 301 is a component to a pool-type reactor. The capture system valve 312 may be configured to allow the extraction system to be included in the capture system pipe 310 when in an open position. The attachment rod 306 may be connected to the absorbent framework 304 and be configured to selectively submerge the absorbent framework 304 into the flow of molten salt. FIG. 3 highlights other components of the extraction system 300 that may be included for its implementation into the molten salt loop of a molten salt reactor system. For example, the extraction system 300 may further include a first flange 314 to anchor the extraction system to the pipe 301. Additionally, the extraction system 300 may include a blind flange 316 to enclose the capture system within the capture system pipe 310. The first flange 314 and blind flange 316 may each include attachment means, such as bolts or screws, to reversibly anchor each flange to its respective component.

The present invention may include a rod-driven extraction system to facilitate extraction of fission products. The rod-driven extraction system may be attached to the absorbent framework and facilitate its submersion into the flow of molten salt. For clarity, the rod-driven extraction system may be referred to as a "coupon sampler." Such a rod-driven extraction system may be that of the systems, apparatuses, and methods described in U.S. Nonprovisional patent application Ser. No. 18/778,349, which is hereby incorporated by reference in its entirety.

For example, the rod-driven extraction system may be integrated with a run of pipe or segment between one or more of the reactor vessels 102, the reactor access vessel 110, the pump 104, the heat exchanger 106, and/or the drain tank 108. Additionally or alternatively, the rod-driven extraction system may be integrated with a side run or by-pass pipe along the pipe of the main loop in order facilitate removal. In several embodiments, the rod-driven extraction system is extraction system 112 of FIG. 1. Additionally or alternatively, the rod-driven extraction system may be integrated with a vessel or component itself. For example, the rod-driven extraction system may be integrated with, such as being attached to otherwise fluidically coupled with or installed with, one or more of the reactor vessels 102, the reactor access vessel 110, the pump 104, the heat exchanger 106, and/or the drain tank 108 and/or other component of the reactor system 100. In other examples, the rod-driven extraction system may be integrated with other systems, subsystems, assemblies and the like of the molten salt or other system.

Figure 4A:
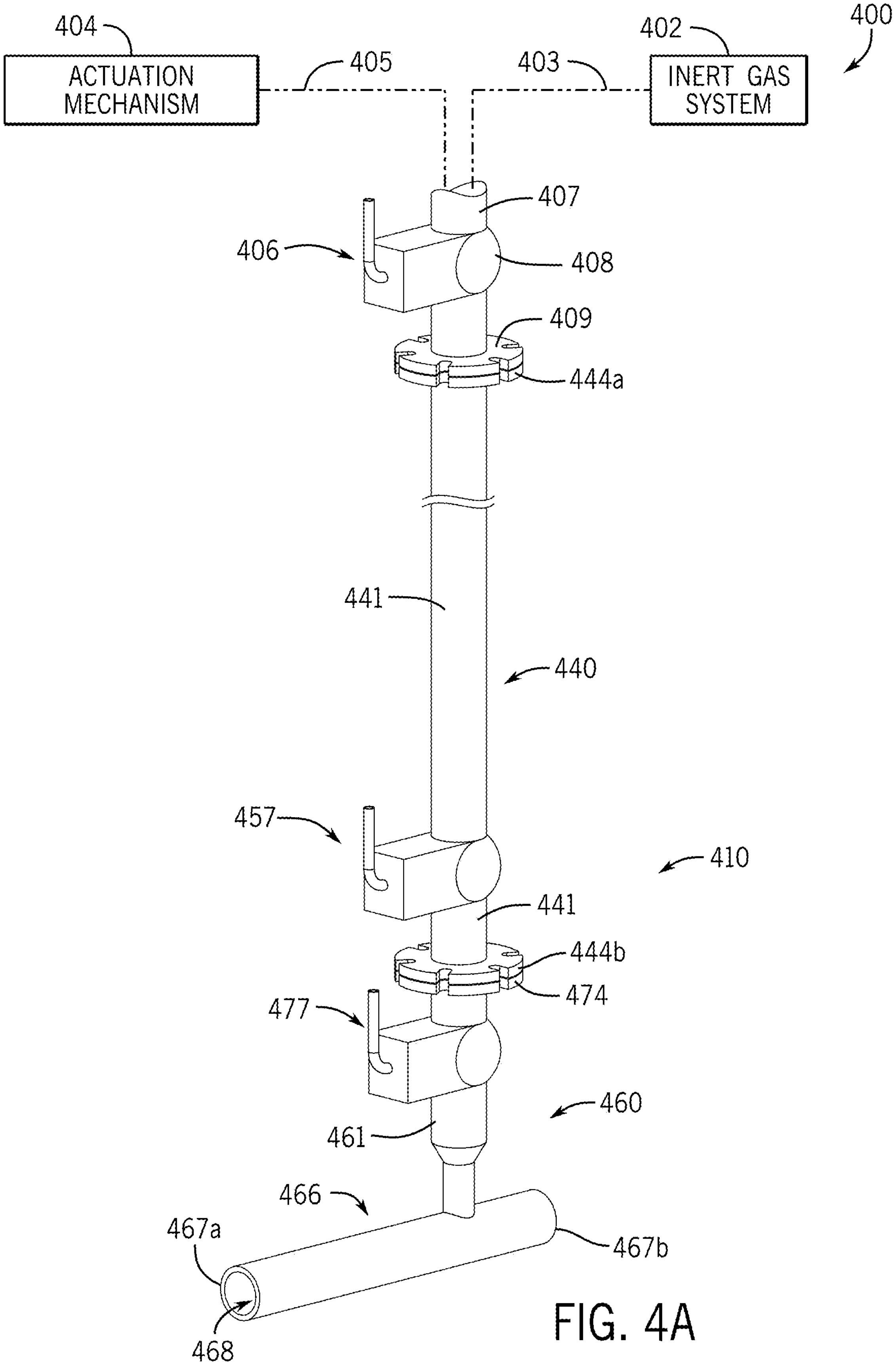
FIG. 4A illustrates another example extraction system.

FIG. 4A depicts a system 400 including a rod-driven extraction system 410 for use with the molten salt reactor system of FIG. 1. The example system 400 may be utilize as the mechanism for submerging the absorbent framework into the flow of molten salt. The example system 400 is configured to facilitate inclusion of the absorbent framework into the molten salt loop and facilitate its remove therefrom in order to harvest the extracted fission products. The system 400 may generally include any of a variety of components and subassemblies that cooperate to allow for an absorbent framework to be moved into and out of a flow of a molten salt. The system 400 may further include any of a variety of components and subassemblies that cooperate to allow the absorbent framework to remain an inert environment prior to, during, and subsequent to the material coupon being arranged in the molten salt. To facilitate the foregoing, as shown in FIG. 4A, the system 400 may include an inert gas system 402, a linear actuation mechanism 404, a coupling assembly 406, and the rod-driven extraction system 410. The rod-driven extraction system 410, as will be described in greater detail below, may include an attachment rod 420 (as shown in cutaway view of FIG. 4B), which includes a tip or paddle (e.g., an absorbent framework 426) that defines the absorbent framework which the rod-driven extraction system 410 is configured to move into, and out of, the flow of molten salt. The rod-driven extraction system 410 is configured to receive the attachment rod 420, and contain the attachment rod 420 within an interior sampling channel of the rod-driven extraction system 410.

Figure 4B:
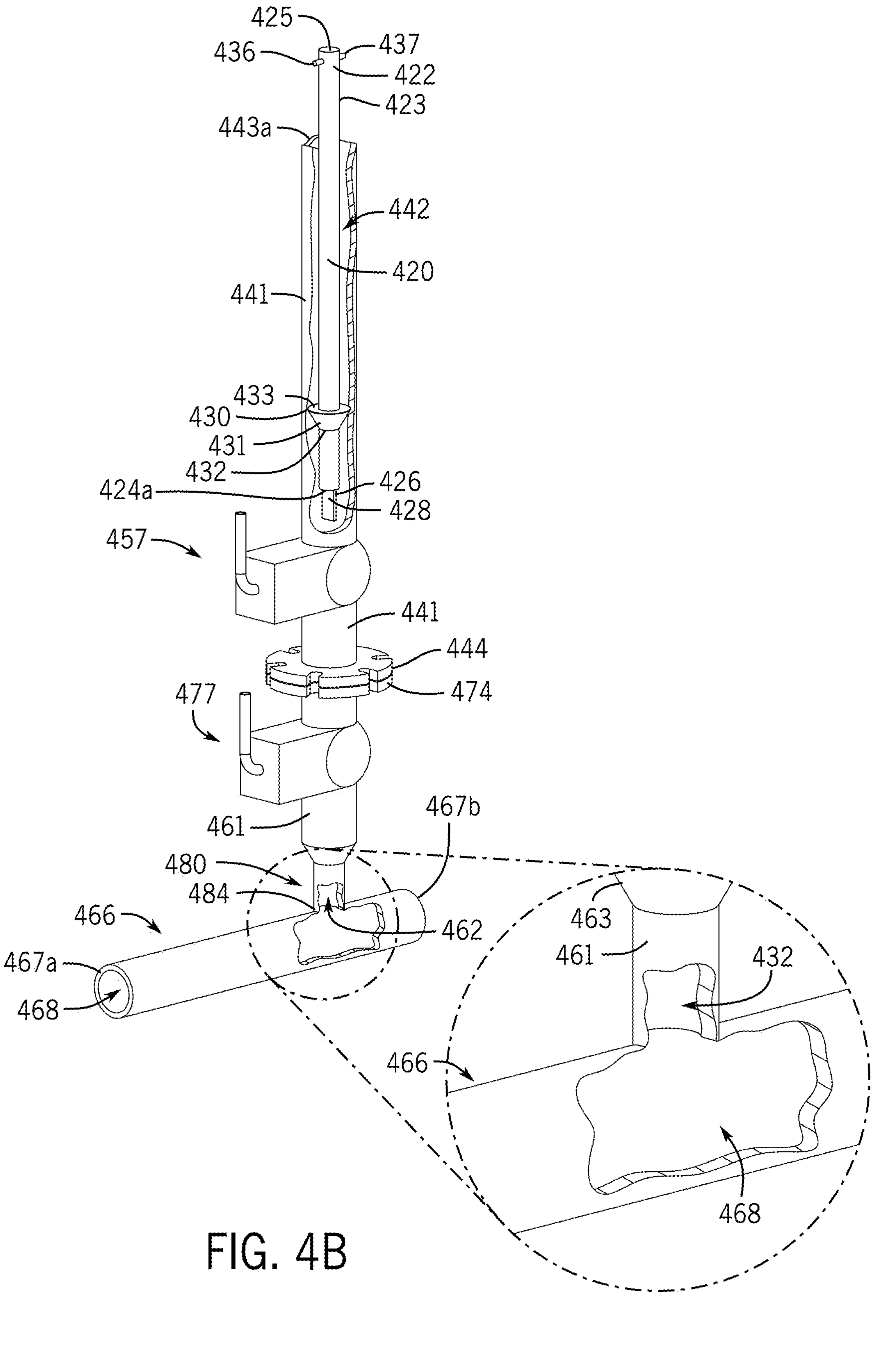
FIG. 4B illustrates a semi-transparent view of the example extraction system of FIG. 4A.

The rod-driven extraction system 410 is shown in FIGS. 4A and 4B as including an upper assembly 440 and a lower assembly 460. The lower assembly 460 may generally be any collection of pipe runs, valves, collars, transition pieces, instruments or the like that cooperate to allow for an introduction of the attachment rod 420 into the flow of molten salt material from the inert environment of the rod-driven extraction system 410. The upper assembly 440 may generally be any collection of pipe runs, valves, collars, transition pieces, instructions or the like that cooperate to allow for the retrieval of the attachment rod 420 into an inert environment from the flow of molten salt material and for sealing the attachment rod 420 therein for transport to another inert environment. As described in greater detail herein, the rod-driven extraction system 410 may be configured to move the attachment rod 420 from an isolation position fully within the upper assembly 440, to a sampling position in which at least a portion of the attachment rod 420 is disposed in a flow of a molten salt. The rod-driven extraction system 410 may be further configured to move the attachment rod 420 from such sampling position back to the isolation position.

To facilitate the foregoing, the rod-driven extraction system 410 may be operatively coupled with or include or otherwise be associated with the actuation mechanism 404. The actuation mechanism 404 may include a variety of components that are used to move, such as raising or lowering, the attachment rod 420 within the rod-driven extraction system 410. The actuation mechanism 404 may be configured to actuate the attachment rod 420 via an operative connection 405 using one or more of a magnetic coupling, a robotic coupler, a cable, a pressure differential and/or other mechanism, including hand operation. For example, the actuation mechanism 404 may include one or more magnetic drives that is configured to magnetically couple with a corresponding magnetic element of the attachment rod 420 such that movement of the magnetic drive of the actuation mechanism 404 causes a corresponding movement of the attachment rod 420 within the rod-driven extraction system 410. In another example, the actuation mechanism 404 may include one or more robotic grabbers, such as one or more articulable linkages or other mechanical elements, that are configured to enter the rod-driven extraction system 410 and physically engage a structure of the attachment rod 420. In turn, the robotic grabber may be moved, such as being moved up and down, in order to cause a corresponding movement of the attachment rod 420, and subsequently the absorbent framework, within the rod-driven extraction system 410. In another example, the actuation mechanism 404 may include one or more cables that are configured to enter the rod-driven extraction system 410 and physically engage a structure of the attachment rod 420. In turn, the cable may be moved, such as being moved up and down, in order to cause a corresponding movement of the attachment rod 420 within the rod-driven extraction system 410. In another example, the actuation mechanism 404 may include one or more valves, seals, and insert gas lines that are configured to induce a pressure differential across the attachment rod 420 within the rod-driven extraction system 410. Such pressure differential may be operative to move the attachment rod 420 therein. In other examples, other actuation mechanisms 404 are contemplated herein.

The rod-driven extraction system 410 may be configured to maintain the attachment rod 420 fully within an inert environment prior to, during, and subsequent to the placement of the attachment rod 420 within the flow of molten salt and consequently the absorbent framework. In this regard, the inert gas system 402 is shown in FIG. 4A as having an operative connection 403 for supply of an inert gas, such as a helium or other inert gas, to the rod-driven extraction system 410. The inert gas system 402 may include any appropriate source of inert gas, such as a source of inert gas supplied from a gas vessel, bottle, or other source. The inert gas system 402 may be configured to continuous supply inert gas to the rod-driven extraction system 410 such that the attachment rod 420 (or a portion thereof) is continually encompassed by the inert gas. Further, the inert gas system 402 may be configured to continuously supply such inert gas at a pressure that is sufficiently elevated in order to maintain a positive pressure within an internal volume or channel of the rod-driven extraction system 410. In some cases, the inert gas pressure may be maintained in the rod-driven extraction system 410 at a sufficiently high pressure so that the inert gas supports backflow prevention or otherwise helps to mitigate the flow of the molten salt into the lower assembly 460 and/or the upper assembly 440.

In one implementation, the inert gas system 402 may deliver inert gas directly to the upper assembly 440 of the rod-driven extraction system 410. In other examples, such as that shown in FIG. 4A, the rod-driven extraction system 410 may be operative coupled with the inert gas system 402 (and the actuation mechanism 404) via a coupling assembly 406. In one example, the coupling assembly 406 may be configured to establish a fluidic coupling between the rod-driven extraction system 410 and the inert gas system 402. Additionally or alternatively, the coupling assembly 406 may be configured to define a pathway by which one or more components of the actuation mechanism 404 may engage the attachment rod 420. For example, the coupling assembly 406 may provide a pathway by which the robotic grabber or the cable may advance through the system 400 for engagement with the attachment rod 420 within an inner channel of the rod-driven extraction system 410.

In this regard, in the example shown in FIG. 4A, the coupling assembly 406 is shown as include a coupling pipe portion 407, an isolation valve 408, and a coupling flange 409. The coupling pipe portion 407 may include a run of stainless steel or other material pipe by inert gas and/or components of the actuation mechanism 404 may reach the attachment rod 420. The isolation valve 406 may be operable to control a flow of the inert gas to the rod-driven extraction system 410, such as may be desired for disconnecting the upper assembly 440 (and the attachment rod 420 held therein) from the system 400 subsequent to fission product extraction. The isolation valve 406 may be integrated with the coupling pipe portion 407 in any appropriate manner such that isolation valve 406 may fully block the coupling pipe portion 407, and upon operation of the valve 406, return the coupling pipe portion 407 to a fully opened state. The flange 409 may be used to mechanically attach the coupling assembly 406 to the upper assembly 440, such as attaching the coupling assembly 406 to a flange or other connection piece of the upper assembly 440. In other examples, other components of the coupling assembly 406 are contemplated herein for delivery of the inert gas to the attachment rod 420 and to support the actuation of the attachment rod 420 within the rod-driven extraction system 410. In some cases, one or more or all of the components of the coupling assembly 406 may be integrated into the upper assembly 440. For example, the upper assembly 440 may include one or more additional isolation valves proximal to the actuation mechanism 444 and/or the inert gas system 402. In this regard, each end of the upper assembly 440 may be fluidically isolated from any associated piping and process equipment prior to physical removal from the system 400. This may allow the upper assembly 440 to maintain an inert environment therein during and subsequent to disconnection from the system 400.

Figure 5A:
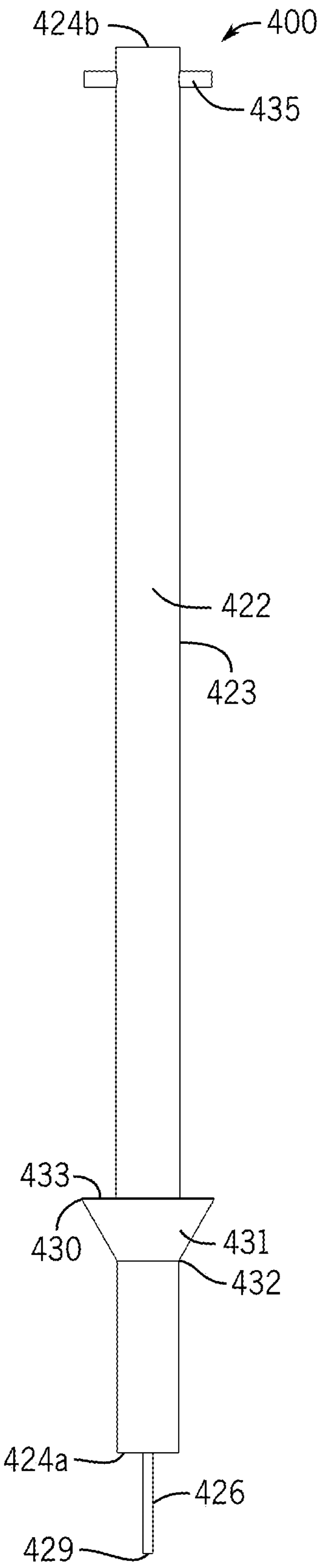
FIG. 5A illustrates a side view of an attachment rod of the example extraction system of FIG. 4A.
Figure 5B:
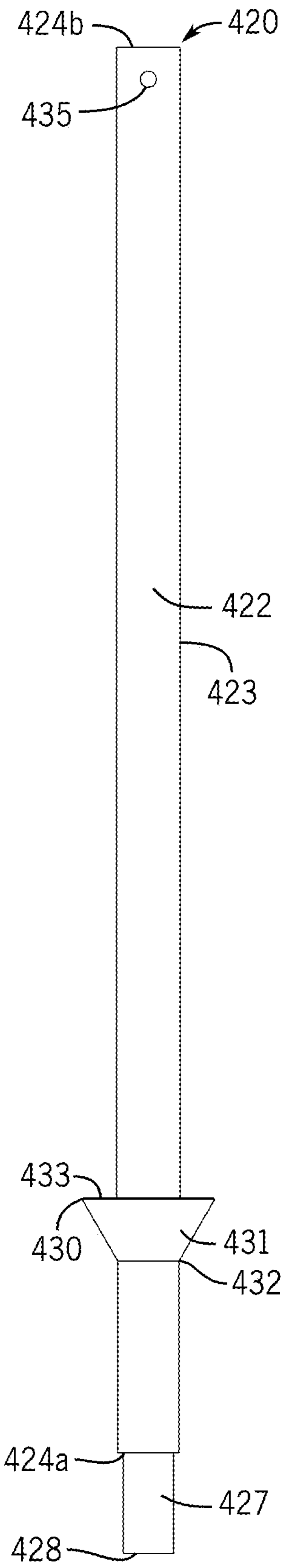
FIG. 5B illustrates a front view of the attachment rod of the example extraction system of FIG. 4A.
Figure 5C:
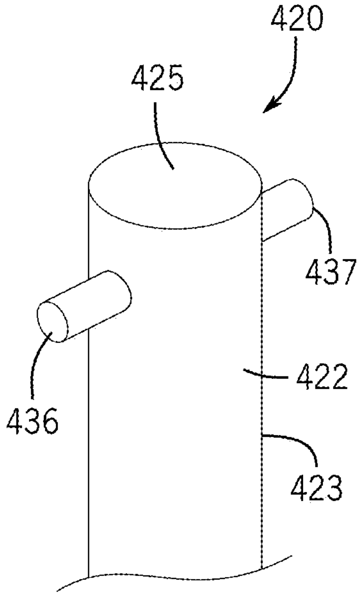
FIG. 5C illustrates an isometric view of a top portion of the attachment rod of the example extraction system of FIG. 4A.

With reference to FIGS. 5A-5C, the attachment rod 420 is shown. The attachment rod 420 or coupon rod is shown a one-piece integrally formed structured. The attachment rod 420 may be formed from a stainless-steel material (e.g., SS316H or other material). While the attachment rod 420 is shown in FIGS. 5A-5C as a one-piece structure, it will be appreciated that in other examples, the attachment rod 420 may be an assembly of two or more components. In either case, the attachment rod 420 may serve a variety of functions with the rod-driven extraction system 410. For example, the attachment rod 420 may allow for fission product extraction, and the attachment rod 420 is itself the object connected to the absorbent framework (including a temperature resistant cartridge and an absorbent composition) and serving as the connection means to cause the absorbent framework to be subject to the molten salt. Additionally, the attachment rod 420 may control the motion of the absorbent framework. Additionally, the attachment rod 420 may provide an attachment point for other subcomponents, including those subcomponents of the actuation system 404. Additionally, the attachment rod 420 may be configured for actuation within the rod-driven extraction system 410 via the magnetic coupling, the robotic grabber, the cable, the pressure differential, or by other means. Additionally, the attachment rod 420 may serve to align the absorbent framework with respect to the flow of the molten salt. For example, the attachment rod 420 may include various stop or other features to set maxim depth by which the attachment rod 420, and subsequently the absorbent framework, may extend into the flow of molten salt.

To facilitate the foregoing, the attachment rod 420 may be a monolithic structure of a stainless-steel material. The attachment rod 420 may be formed via machining. Additionally or alternatively, the attachment rod 420 may be formed via segments, in particular for more precision and exotic absorbent framework geometry (See FIGS. 6A-7B as an example). In the event that a portion of the attachment rod 420 is segmented, the attachment rod 420 may be welded together or mechanically threaded together in order to attach the constituent parts to one another.

In the monolithic structure shown in FIGS. 5A-5C, the attachment rod 420 is shown as including an elongated portion 422, an absorbent framework 426, a stop feature 430, and an engagement feature 435. The elongated portion 422 may define a cylindrical surface 423 extending from a first end 424*a* to the second end 424*b* to define the attachment rod as a generally rod-shaped structure. In this regard, the elongated portion 422 may have a generally circular cross-section 425 extending between the first and second ends 424*a*, 424*b*. The absorbent framework 426 may protrude from a bottom end of the elongated portion 422 and be configured for placement in the flow of the molten salt. For example, the absorbent framework 426 may be a tip 428 or terminal end of the attachment rod 420 that is dipped into the molten salt such that a portion of the attachment rod 420 remains exposed to the molten salt over a selected period of time. The absorbent framework 426 may have any appropriate geometry in order to facilitate the capture of fission products. Such appropriate geometry may be caused by the shape of the temperature resistant cartridge (e.g., cartridge 205*a*, 205*b*, 205*c*, 600*a*, 600*b*, 700) housing the absorbent framework (e.g., absorbent framework 207*a*, 207*b*, 207*c*) (e.g., a metal-organic framework, carbon nanotube, or absorbent microspheres). Additionally or alternatively, the geometry may be cause by the shape of the absorbent composition and/or the shape of the substrate to which the absorbent composition is adhered to. In the example shown in FIGS. 4A-4C, the absorbent framework 426 is generally rectangular shape and has a paddle face 427 configured to face a flow of the molten salt. A thickness of the absorbent framework 426 may be defined by an edge 429, which may have a cross-dimension that is substantially less than a cross-dimension of the paddle face 427. Such geometry may support the exposure of the absorbent framework 426 to operational flow of the molten salt over time. In other cases, other geometries of the absorbent framework 426 may be desirable (See, for example FIGS. 6A-7B).

The stop feature 430 is shown in FIGS. 5A-5C as being generally proximal to the second end 424*b* or the attachment rod 420. The stop feature 430 may extend away from the elongated portion 222 in manner that allowed the stop feature 230 to define a maximum extent to which the absorbent framework 426 is placed in the flow of the molten salt. For example, the stop feature 430 may defined by a conical surface 431 extending from a first edge 432 to a second edge 433. As described herein, the conical surface 431 may be complementary with one or more other components of the rod-driven extraction system 410 such that the mating of the conical surface 431 with said complementary surface may prevent further movement of the attachment rod 420 in at least one direction.

The engagement feature 435 may be any appropriate component integrated with the elongated structure 422 for operable coupling of the attachment rod 420 with the actuation mechanism 402, other actuation mechanism. For example, the engagement feature 435, as shown in FIGS. 5A-5C, may include a first engagement structure 436 and a second engagement structure 437, each protruding from the elongated structure 422 proximal the first end 424*a*. The first and second engagement structures 436, 437 may be cylindrical features, for example, that define a landing by which a robotic grabber can engage the attachment rod 420 for actuation within the rod-driven extraction system 410. Additionally or alternatively, the first and second engagement structures 436, 437 may include magnetic elements for magnetic coupling with a magnetic drive of the actuation mechanism 404. Additionally or alternatively, the first and second engagement structures 436, 437 may include a hook or other receiving structure for engagement with a cable of the actuation mechanism 404. Additionally or alternatively, the first and second engagement structures 436, 437 may include a flap, plunger or other mechanism via which a pressure differential can be maintained across the attachment rod 420. In other examples, other applications and structures of the engagement structures and features are contemplated herein. Such robotic grabbers, magnetic elements, hook or receiving structures, flap, or plunger mechanism that form the actuation mechanisms 404 may be those described in U.S. Nonprovisional patent application Ser. No. 18/778,349, which is hereby incorporated by reference in its entirety.

Figure 6A:
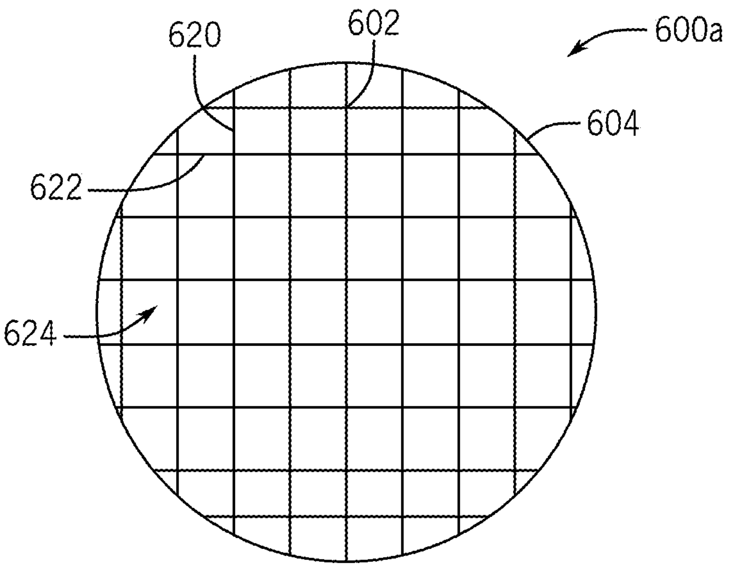
FIG. 6A illustrates an example cartridge of the example extraction systems.
Figure 6B:
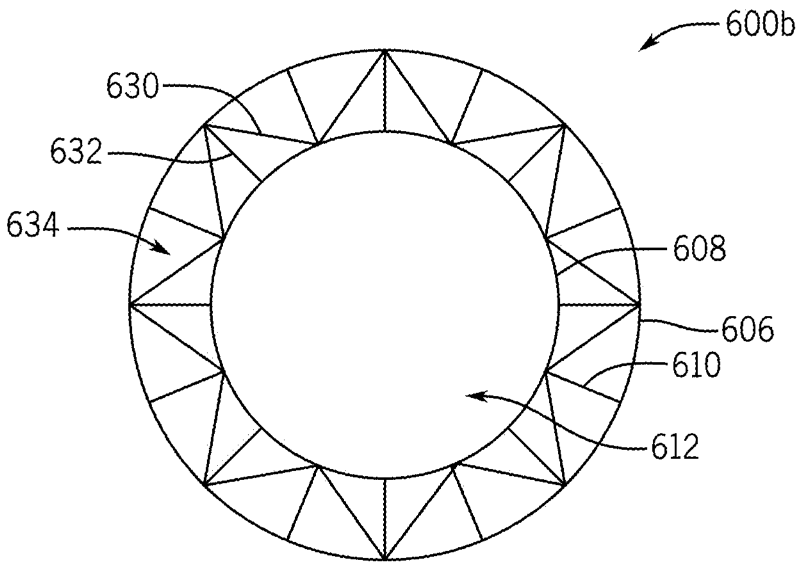
FIG. 6B illustrates another example cartridge of the example extraction systems.

Turning now to FIGS. 6A and 6B, example temperature resistant cartridges 600*a*, 600*b* are shown. In many embodiments, temperature resistant cartridges 600*a*, 600*b* are substantially analogous to those described in reference to FIGS. 2A-2C. In many embodiments, the temperature resistant cartridge is of a mesh shape. For example, in FIGS. 6A and 6B, cartridge 600*a* may have a generally circular shape (or any other shape that fits axially in the pipe 201, 301, 466) and have a mesh shape that includes or is configured to house the absorbent composition. In FIG. 6A, the cartridge 600*a* includes a cartridge outer wall 604 and mesh structure 602. Note that in FIG. 6A, the mesh structure 602 is in a checker-board design, though any other configuration of the mesh structure 602 may also be used in the extraction system 112, 410. For example, mesh structure 602 comprises a first lateral strands 620 and a second lateral strands 622. The first and second lateral strands 620, 622 may be arranged in a cross-wide pattern to define through potions 624 therebetween. The through potions 624 may be configured to permit the flow of molten salt therethrough such that fission products may contact an absorbent composition placed therein. The through portions 624 may be further configured to prevent absorbent compositions from exiting the cartridge 600*a*. For example, and with reference to FIG. 2A, the absorbent composition 207*a* is shown as being housed in cartridge 205*a* and engaged in intermolecular bonding with fission products 203. In FIG. 6B, the cartridge 600*b* may have an outer wall 606 and an inner wall 608 and a mesh structure 610 there between, and also defines an inner opening 612 that allows the molten fuel salt to flow through without much hindrance or impedance to the flow of molten salt. Mesh structure 610 comprises first lateral strands 630 and second lateral strands 632. The first and second lateral strands 630, 632 may be arranged in a continuation pattern that defines substantially triangular through portions 634. The through potions 634 may be configured to permit the flow of molten salt therethrough such that fission products may contact an absorbent composition placed therein. The through portions 634 may be further configured to prevent absorbent compositions from exiting the cartridge 600*b*. For example, and with reference to FIG. 2A, the absorbent composition 207*a* is shown as being housed in cartridge 205*a* and engaged in intermolecular bonding with fission products 203.

Figure 7A:
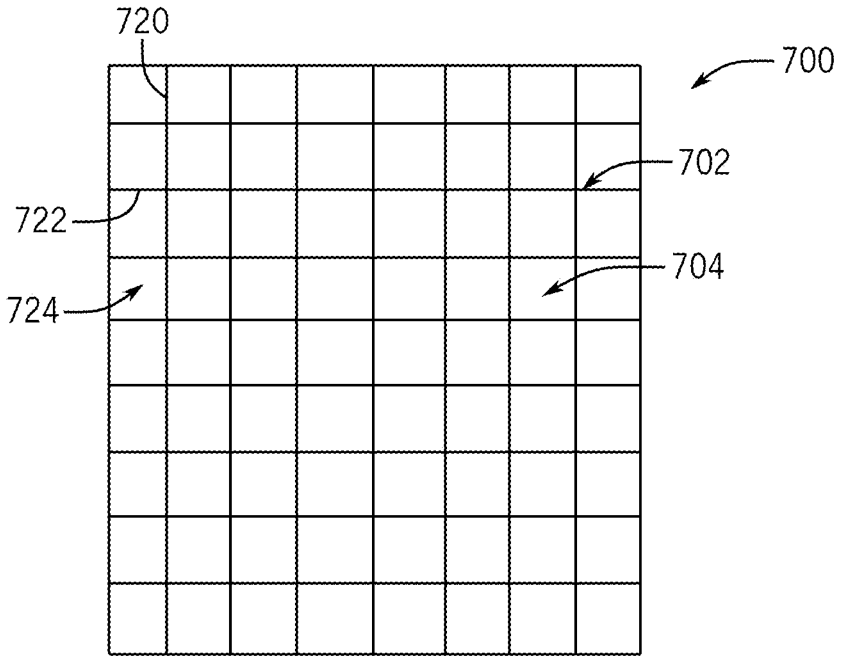
FIG. 7A illustrates yet another example cartridge of the example extraction systems.
Figure 7B:
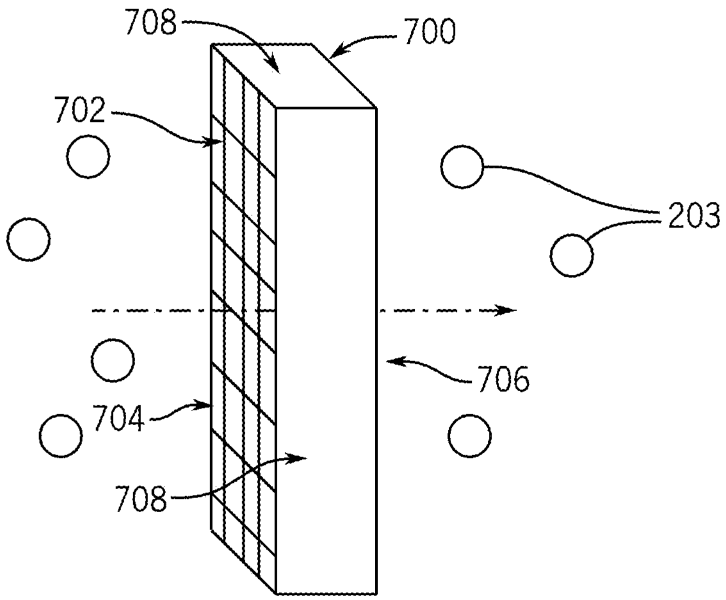
FIG. 7B illustrates an isometric view of the example cartridge of FIG. 7A.

Turning to FIGS. 7A and 7B, a front side of an example cartridge 700 and a side perspective view of the example cartridge 700 are shown, according to one embodiment of the present disclosure. The cartridge 700 may be substantially analogous to that described in FIGS. 6A-6B, includes a front face 702 that defines openings 704 throughout the cartridge 700. Mesh structure 702 comprises a first lateral strands 720 and a second lateral strands 722. The first and second lateral strands 720, 722 may be arranged in a cross-wide pattern to define through potions 724 therebetween. The through potions 724 may be configured to permit the flow of molten salt therethrough such that fission products may contact an absorbent composition placed therein. The through portions 724 may be further configured to prevent absorbent compositions from exiting the cartridge 700. For example, and with reference to FIG. 2A, the absorbent composition 207*a* is shown as being housed in cartridge 205*a* and engaged in intermolecular bonding with fission products 203. As shown in FIG. 7B, the cartridge 700 has a side wall 708, having some width, so that the absorbent composition (e.g., absorbent composition 207*a*) may be held within the front face 702 and the back face 706 without spreading out into the molten fuel salt. In one or more embodiments, the molten fuel salt comprising fission products 203 may flow through the cartridge 700 without material interruptions to the flow of the molten fuel salt but enabling capture of fission products 203.

In many embodiments, the temperature resistant cartridges 600*a*, 600*b*, and 700 may be made of materials that are heat resistant and corrosion resistant, such as stainless steel. In some embodiments, the temperature resistant cartridges 600*a*, 600*b*, and 700 may be formed from a material having an affinity for at least one of the fission products (such as, but not limited to, stainless steel, Hastelloy N, titanium, or any other materials that can withstand such harsh conditions within the system 100). Additionally, the cartridges 600*a*, 600*b*, and 700, and specifically, the respective mesh structures 602, 610, 702 may be designed so that the mesh structures 602, 610, 702 do not interrupt molten fuel salt flow in the system 100 but allow the molten salt to flow therethrough and contact the absorbent composition. The mesh structures 602, 610, 702 may be configured such that the absorbent composition cannot escape through the mesh. Though a circle and rectangular mesh structures are shown in FIGS. 6A-7B, any shape of the mesh structure that does not interrupt molten fuel salt flow are contemplated by this present disclosure. Additionally, the mesh structures 602, 610, 702 are configured to house the absorbent compositions and facilitate contact with the molten salt (and subsequently capture fission products present therein).

In several embodiments, the absorbent framework (e.g., a metal-organic framework) may be built or placed onto the mesh structures 602, 610, 702 so that when certain fission products make contact with the absorbent composition, the certain fission product are captured by the absorbent composition via a variety of mechanism. Fission product capture may be generally facilitate through absorption and/or adsorption. For example, and with reference to FIGS. 2A-2C, the fission products 203 may be captured via intermolecular forces between the absorbent composition 207*a* and the fission products 203 after flowing through temperature resistant cartridge 205*a*. Such intermolecular forces may include those between a metal-organic framework and fission products, such as but not limited to, ion-ion interaction, Van der Waals forces, dipole-dipole forces, ion-dipole interactions, hydrogen bonding, or any combination thereof. Additionally or alternatively, the capture mechanisms may include a metal-organic framework having a porous structure with several pores of a size to allow fission products to penetrate the metal-organic frameworks. Such plurality of pores may be advantageous for capturing fission products as they effectively increase the surface area of contact between the metal-organic framework and the fission products. Additionally, or alternatively, the metal-organic framework may include or have constituents that have an electrostatic charge opposite of that of the fission products, thus causing binding of the fission products to the metal-organic framework upon contact. Additionally, or alternatively, the pores of the metal-organic framework may physically capture the fission products by being of a size to allow entry of said fission products while prohibiting exit. In other embodiments, the absorbent composition is a carbon-nanotube structure with binding sites with an affinity to fission products. Such binding sites may be the surface of the carbon-nanotube and/or may be the surface of a coating of the carbon-nanotubes. In other embodiments, the absorbent composition is an array or cluster of microspheres formed or coated with a material having an affinity to fission products. As stated above, the absorbent composition (e.g., metal-organic framework, carbon nanotube, microspheres, or combination thereof) should be resistant to high heats, corrosion resistant, and have any affinity for at least one of the fission products.

After a certain period of time, or after other parameters are hit, the absorbent framework 204, 304, 426, (including cartridge 600*a*, 600*b*, 700) may be pulled out of the fission product removal system 112, and the absorbent composition may be processed to single out the one or more fission products. Such processing may include washing said absorbent composition with a solvent configured to unbind the fission products from the absorbent composition. Such processing may include known methods for removing fission products from the absorbent framework. Such processes may be followed by known methods for isolating certain fission products from others. For example, the present invention may utilize the system and methods described in U.S. Nonprovisional application Ser. No. 18/771,047 filed Jul. 12, 2024, which is hereby incorporated by reference in its entirety.

Figure 8:
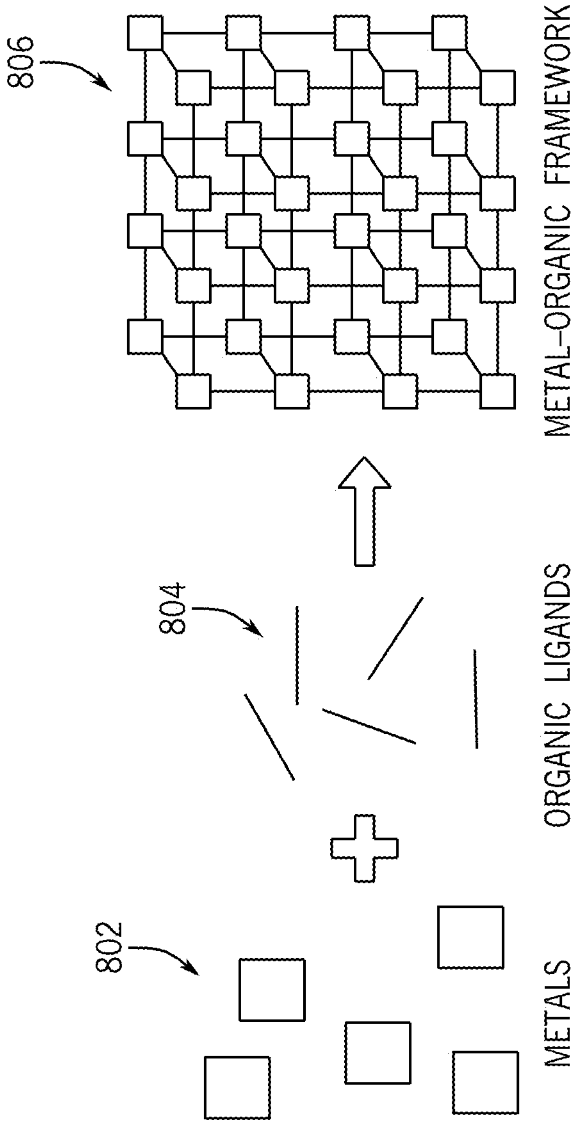
FIG. 8 illustrates a simplified synthesis scheme for metal-organic frameworks.
Figure 9C:
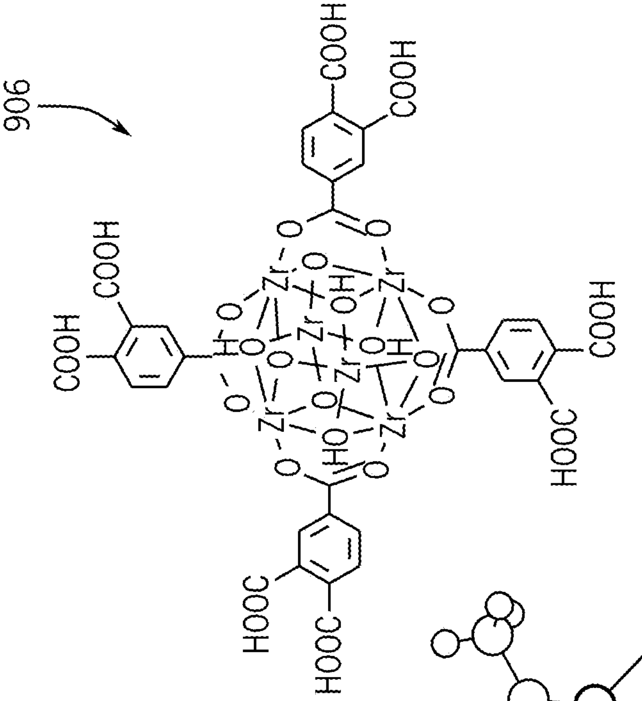
FIG. 9C illustrates a molecular structure of yet another example metal-organic framework.
Figure 9B:
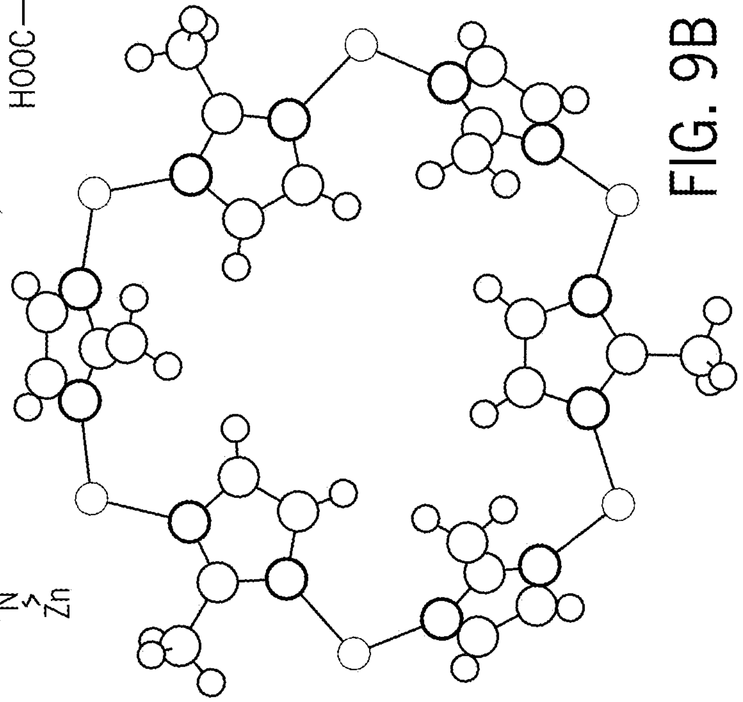
FIG. 9B illustrates a molecular structure of another example metal-organic framework.
Figure 9A:
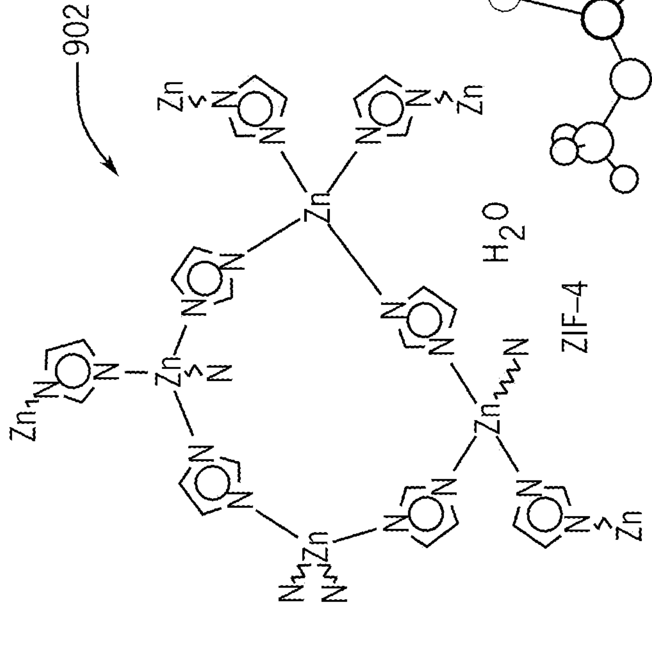
FIG. 9A illustrates a molecular structure of an example metal-organic framework.

In several embodiments, the absorbent composition is a metal-organic framework (MOF). Turning now to FIG. 8, a simplified chemical synthesis of a generic MOF structure 806 is shown. As illustrated in FIG. 8, a MOF may be generally formed by combining metals or metal clusters 802 with organic ligands 804 in such a way to form a generic MOF structure 806. Generally, MOFs (e.g., having a structure similar to MOF structure 806) have a porous coordination polymer that may be one, two, or three-dimensional crystalline structure consisting of metal cluster notes (i.e., metal clusters 802) and organic linkers (i.e., organic ligands 804). Unique properties of MOFs include permanent nanoscale porosity, high surface area, structural flexibility, open metal sites, in-pore functionality, and out-surface modification make them an excellent candidate for gas storage and separation, absorption, and/or adsorption. However, their applicability is limited by their poor thermostability. However, the present disclosure contemplates utilizing and synthesizing certain MOFs with high thermostability and/or MOFs synthesized in such a way to form a structure which imparts high thermostability. For example, and with reference to FIGS. 9A-9B, the absorbent composition may include ZIF-4 902 or ZIF-8 904. ZIF-4 902 and ZIF-8 904 may generally be a zeolitic imidazolate framework synthesized as crystals by copolymerization of zinc or copper (i.e., metal clusters 802) with imidazolate links (i.e., organic ligands 804). For example, and with reference to FIG. 9C, the absorbent composition may include UiO-66 906 ("Universitetet i Oslo") or a modification of UiO-66 906. UiO-66 906 includes zirconium metal clusters (i.e., metal clusters 802) connecting 1,4-benzenedicarboxylic acid linkers (i.e., organic ligands 804). UiO-66 906 may be an advantages absorbent/adsorbent composition due to its thermal stability, chemical resistance, chemical stability, high surface area, high porosity, abundance of absorbent sites, tunable surface chemistry, strong host-guest interaction, and high coordination level.

However, while UiO-66 may have high thermal stability, certain variables may be needed to increase its thermal stability to allow UiO-66 to survive temperatures of a molten salt reactor system (e.g., MSR system 100 of FIG. 1). Such variables may be found within the structure of the MOF created via particular synthesis parameters. More particularly, UiO-66 is known to only withstand temperatures up to 500° C. (See Abstract of Athar, M (2021). Thermal degradation of defective high-surface-area UiO)-66 in different gaseous environments. RSC Adv., 2021, 11, 38849-38855). The temperature of the molten salt of a MSR system (e.g., MSR system 100) may be between 550° C. to 700° C. with a typical average temperature of about 600° C. Thus, the UiO-66 of the prior art would not be suitable as the absorbent composition of the absorbent framework of the present disclosure. However, synthesis mechanism may be employed to alter UiO-66 to be able to withstand the temperature of an MSR environment (i.e., about 600° C.). The inventors of the present disclosure have reviewed the various synthesis techniques disclosed in the prior art and adapted or otherwise included additional techniques to improve the thermal stability of UiO-66 (and other MOFs). As will be discussed in more detail with reference to the thermogram of FIG. 14, these various synthesis modifications, adaptations, and/or additions have produced MOF compositions (e.g., UiO-66) with a thermal stability of up to 600° C. In some embodiments, these various synthesis modifications, adaptations, and/or additions may produce MOF compositions (e.g., UiO-66) able to withstand temperature above 600° C. Stated otherwise, the various MOF compositions produced by synthesis schemes described herein, unlike those found in the prior art, are unaffected or substantially unaffected by temperature° C. For example, UiO-66 synthesis parameters may be altered to utilize zinc or copper, rather than a zirconium, as the metal source. Additionally or alternatively, UiO-66 may be synthesized utilizing thermal solvolysis to form a crystal structure of UiO-66 capable of withstanding temperatures up to 600° C. Additionally or alternatively, UiO-66 may be synthesized utilizing sonication to form an amorphous powder structure. Additionally or alternatively, UiO-66 may be synthesized utilizing vapor diffusion to form an amorphous glass structure capable of withstanding temperatures up to 600° C.

Figure 10A:
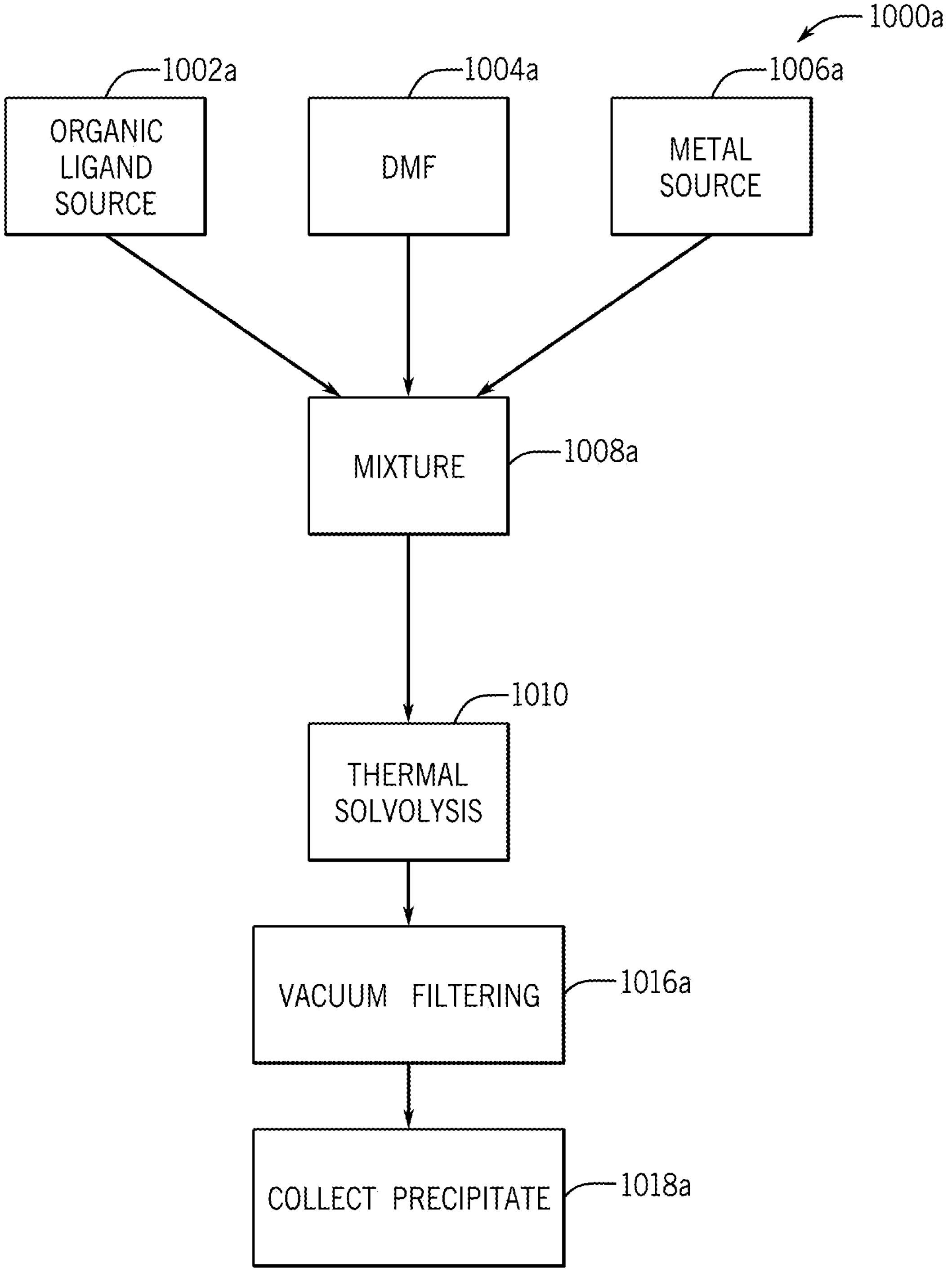
FIG. 10A illustrates an example synthesis scheme for metal-organic frameworks.
Figure 10B:
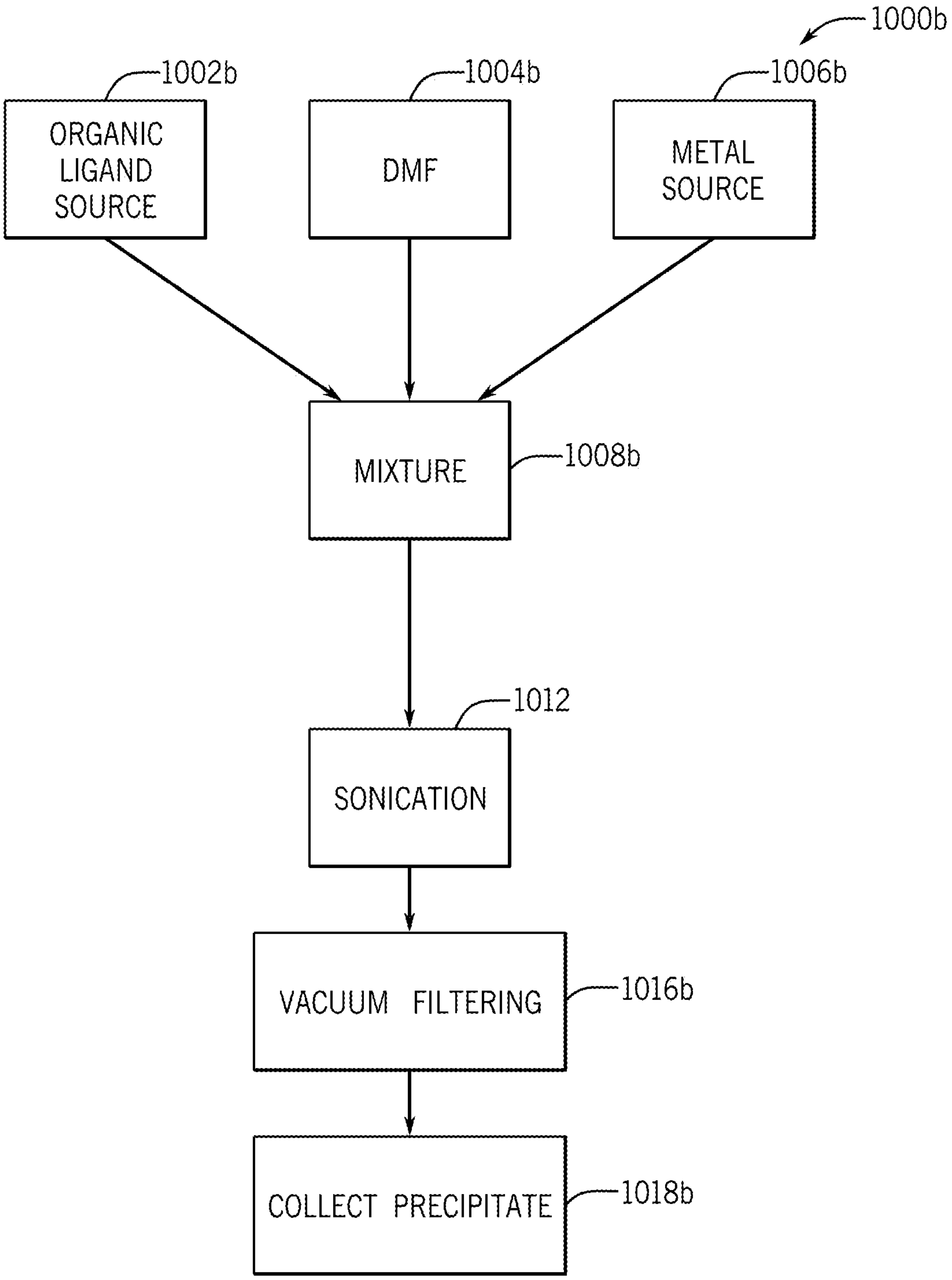
FIG. 10B illustrates another example synthesis scheme for metal-organic frameworks.
Figure 10C:
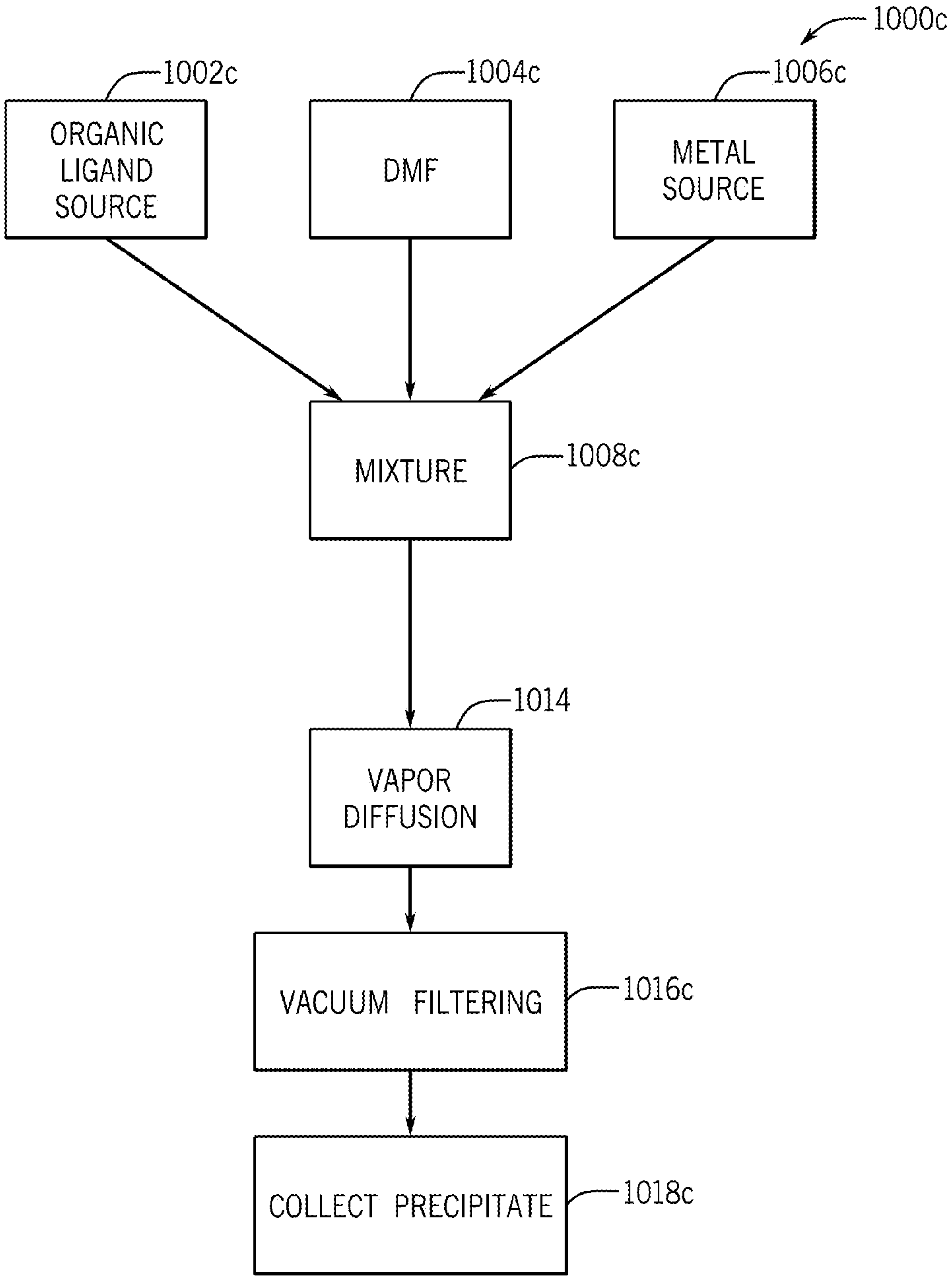
FIG. 10C illustrates yet another example synthesis scheme for metal-organic frameworks.

Turning now to FIGS. 10A-10C, which illustrate various example synthesis schemes 1000*a*, 1000*b*, 1000*c* for synthesis of metal-organic frameworks (MOFs). FIGS. 10A-10C illustrate multiple alternative synthesis techniques to form different physical structures of MOFs. Various MOFs may be synthesized utilizing the example synthesis schemes 1000*a*, 1000*b*, 1000*c* and may be operable to capture fission products. For example, ZIF-4, ZIF-8, UiO-66, and/or derivatives thereof may be synthesized. One of ordinary skill in the art will appreciate that FIG. 10A-10C illustrate simplified synthesis schemes and that other procedures and steps may be included that are not specifically illustrated herein. Additionally, one of ordinary skill in the art will appreciate that there may be alternative methods for facilitating thermal solvolysis 1010, sonication 1012, and vapor diffusion 1014 and that such alternative methods are contemplated herein.

FIG. 10A illustrates a synthesis scheme 1000*a* involving subjecting a mixture of MOF reagents to thermal solvolysis 1010. Initially, at step 1002*a* and 1004*a*, an organic ligand source is mixed with a solvent. The solvent used must be able to dissolve the reagents (i.e., organic ligand source 1002*a* and optionally metal source 1006*a*), deprotonate the organic ligand source 1002*a*, and have a boiling point higher than that of water (i.e., 100° C.). In several embodiments, the solvent used satisfies these requirements, such as dimethylformamide (DMF). The DMF may be added directly to the organic ligand source or many be combined with the mixture at step 1008*a*. The organic ligand source may be 2-aminoterephthalic acid. However, any organic ligand source used to synthesize MOFs known in the art may be used. Then, at step 1006*a*, a metal source may be added to the organic ligand source in DMF solution to produce a mixture (represented by step 1008*a*). For example, the metal source may be zirconyl chloride, zirconyl oxychloride, or zinc nitrate. However, any metal source used to synthesize MOFs known in the art may be used. In some embodiments, at step 1008*a*, the organic ligand source, DMF, and metal source may all be added to a vessel to form a mixture.

Figure 12A:
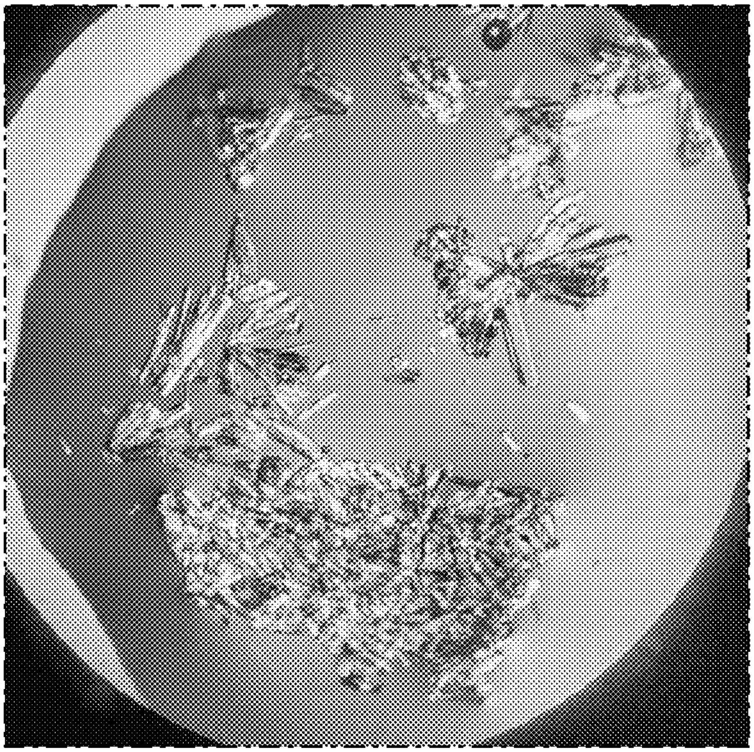
FIG. 12A depicts an example metal-organic framework with a crystal structure.
Figure 12B:
FIG. 12B depicts another example metal-organic framework with a crystal structure.
Figure 12C:
FIG. 12C depicts an example metal-organic framework synthesized via thermal solvolysis.
Figure 12D:
FIG. 12D depicts another example metal-organic framework synthesized via thermal solvolysis.
Figure 12E:
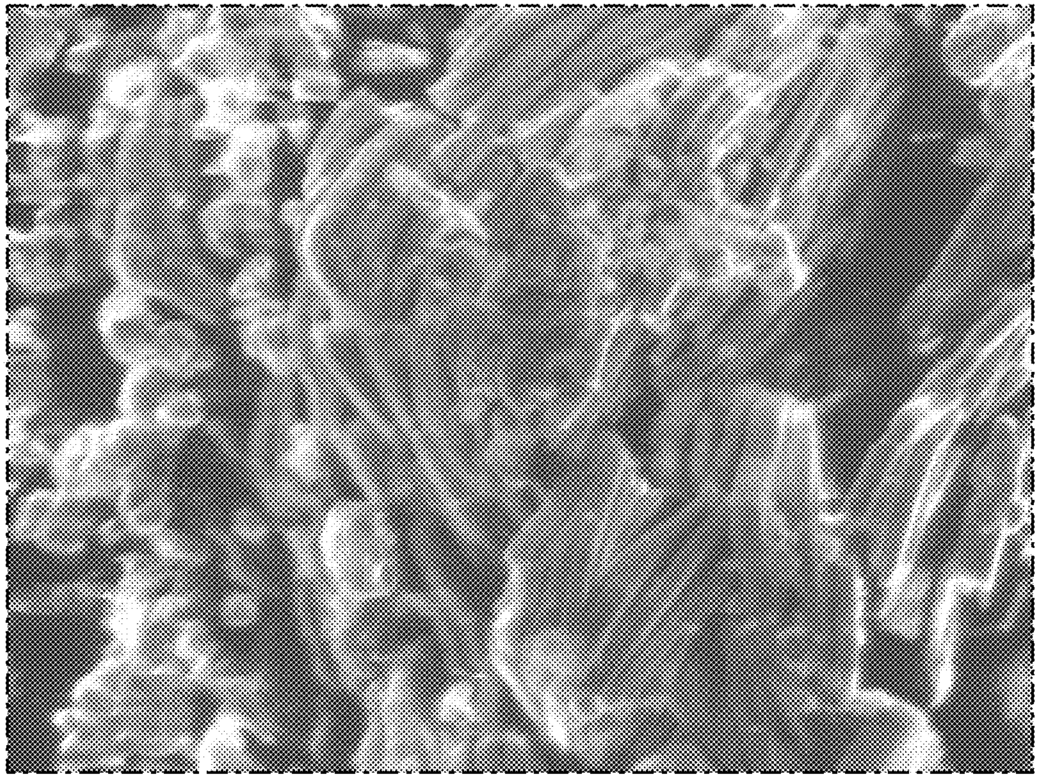
FIG. 12E depicts another example metal-organic framework synthesized via thermal solvolysis viewed using scanning electron microscopy.
Figure 12F:
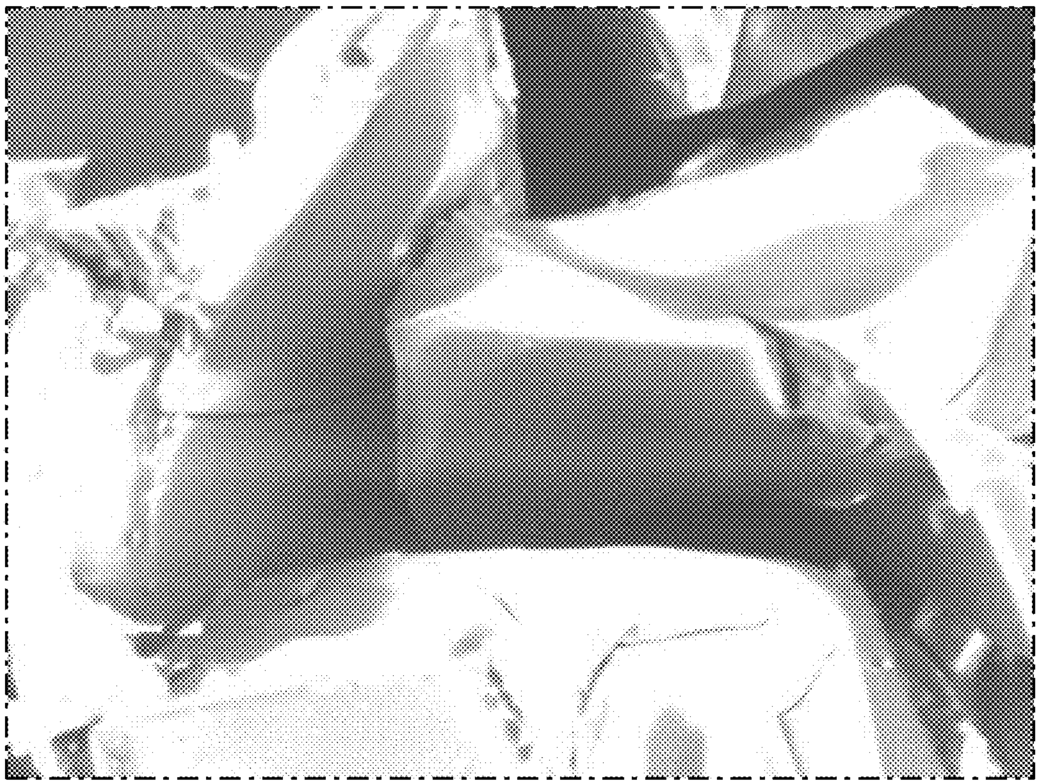
FIG. 12F depicts yet another example metal-organic framework synthesized via thermal solvolysis viewed using scanning electron microscopy.

At step 1010, the mixture may then be subject to thermal solvolysis. Thermal solvolysis may be facilitated by placing the mixture into an autoclave, heating the autoclave to a first temperature for a first length of time and subsequently raising the temperature to a second temperature and maintaining that second temperature for a second length of time. For example, the autoclave may be heated to 80° C. for five hours and then the autoclave may be heated to 120° C. and maintained for 72 hours. Additionally, or alternatively, the first temperature may be 60° C. and may be maintained for 96 hours. In several embodiments, the first temperature is less than the second temperature, but the second length of time may be at least twice as long as the first length of time. Stated otherwise, thermal solvolysis may be facilitated by placing the mixture into an autoclave and heating the autoclave to an initial temperature, maintaining that temperature for a time, raising the temperature, and then maintaining the new temperature for an extended period of time. Following thermal solvolysis and at step 1016*a*, the resulting solution may be allowed to cool to room temperature and is then vacuum filtered. Vacuum filtering may isolate a precipitate containing the MOF from the remaining solution. Following step 1016*a*, the precipitate may be collected at step 1018*a*. The resulting precipitate may be an MOF with a crystal structure (See FIGS. 12A-12F) and may be operable to withstand temperatures up to or about 600° C. The resulting precipitate may be a MOF with an amorphous glass structure (see FIGS. 12C-12D). In several embodiments, the resulting precipitate contains UiO-66; however, such a synthesis scheme 1000*a* may be adopted to synthesize ZIF-4 and/or ZIF-8 depending on the organic ligand source and metal source added to the mixture.

Figure 13A:
FIG. 13A depicts an example metal-organic framework synthesized via sonication prior to drying.
Figure 13B:
FIG. 13B depicts the example metal-organic framework of FIG. 13A after drying.

FIG. 10B illustrates a synthesis scheme 1000*b* involving subjecting a mixture of MOF reagents to sonication 1012. Synthesis scheme 1000*b* may be substantially analogous to that of synthesis scheme 1000*a* and include, at step 1002*b* and 1004*b*, mixing an organic ligand source with an appropriate solvent, such as dimethylformamide (DMF). At step 1006*b*, a metal source may be added to the organic ligand source in DMF solution to produce a mixture (represented by step 1008*b*). Similar to synthesis scheme 1000*a*, the organic ligand source may be 2-aminoterephthalic acid. However, any organic ligand source used to synthesize MOFs known in the art may be used. The metal source may be zirconyl chloride, zirconyl oxychloride, or zinc nitrate. However, any metal source used to synthesize MOFs known in the art may be used. In some embodiments, at step 1008*b*, the organic ligand source, DMF, and metal source may all be added to a vessel to form a mixture. At step 1012, the mixture may be subject to sonication. Sonication may be facilitated by placing the mixture into a sonicator. In some embodiments, water is added to the mixture prior to inclusion into the sonicator. The mixture may then be sonicated, for example, for thirty minutes. In several embodiments, following step 1012, a precipitate in an aqueous solution is formed. The aqueous solution may then be decanted and the solid precipitate may be isolated and allowed to dry. Additionally, or alternatively, the aqueous solution may be vacuum filtered at step 1016*b* to isolate the solid precipitate formed following sonication. Additionally, or alternatively, the dried precipitate may be placed in an oven at, for example 120° C., for a period of time, for example about twelve hours. Following oven drying, the resulting precipitate may be collected at step 1018*b*. The resulting precipitate may be an MOF with an amorphous powder structure (See FIGS. 13A-13B) and may be operable to withstand temperatures up to or about 600° C. In several embodiments, the resulting precipitate contains UiO-66; however, such a synthesis scheme 1000*b* may be adopted to synthesize ZIF-4 and/or ZIF-8 depending on the organic ligand source and metal source added to the mixture.

FIG. 10C illustrates a synthesis scheme 1000*c* involving subjecting a mixture of MOF reagents to vapor diffusion 1014. Synthesis scheme 1000*c* may be substantially analogous to that of synthesis scheme 1000*a* and include, at step 1002*c* and 1004*c*, mixing an organic ligand source with an appropriate solvent, such as dimethylformamide (DMF). At step 1006*c*, a metal source may be added to the organic ligand source in DMF solution to produce a mixture (represented by step 1008*c*). Similar to synthesis scheme 1000*a*, the organic ligand source may be 2-aminoterephthalic acid. However, any organic ligand source used to synthesize MOFs known in the art may be used. The metal source may be zirconyl chloride, zirconyl oxychloride, or zinc nitrate. However, any metal source used to synthesize MOFs known in the art may be used. In some embodiments, at step 1008*c*, the organic ligand source, DMF, and metal source may all be added to a vessel to form a mixture. The mixture may be subject to vapor diffusion at step 1014. Vapor diffusion may be facilitated by placing the mixture into an uncovered vessel and placing that vessel into a larger vessel and adding a solvent, for example triethylamine, into the larger vessel. Then, the mixture may be left undisturbed for a length of time, for example six days. During this time, an amorphous glass or crystal structure may form within the mixture. Thereafter, the resulting solution containing the precipitate may be dried, for example by heating the solution to 120° C. for about twenty-four hours. Additionally, or alternatively, the resulting solution containing the precipitate may be vacuum filtered at step 1016*c* and subsequently collected at step 1018*c*. In some embodiments, following step 1016*c*, the resulting precipitate may be washed with ethanol and dried at low temperatures. The resulting precipitate may be a MOF with an amorphous glass or crystal structure (See FIGS. 12A-12F) and may be operable to withstand temperatures up to or about 600° C. In several embodiments, the resulting precipitate contains UiO-66; however, such a synthesis 1000*c* may be adopted to synthesize ZIF-4 and/or ZIF-8 depending on the organic ligand source and metal source added to the mixture.

Such MOFs synthesized utilizing the various synthesis schemes of FIGS. 10A-10C may be the absorbent composition (e.g., absorbent composition 207*a*, 207*b*, 207*c*) of the absorbent framework (e.g., absorbent framework 204*a*, 204*b*, 204*c*, 304, or 426) and may be configured to have high thermal stability (e.g., up to 600° C.), corrosion resistance, and have an affinity to fission products. Such MOFs may be included in the various extraction systems described herein (i.e., system 112, 300, 400) Such MOFs may be placed in the various cartridges described herein (i.e., cartridge 205*a*, 205*b*, 205*c*, 600*a*, 600*b*, 700). Consequently, such MOFs synthesized utilizing the various synthesis schemes of FIGS. 10A-10C may be operable to capture fission products from a flow of molten salt utilizing the various mechanisms described herein.

Figure 11:
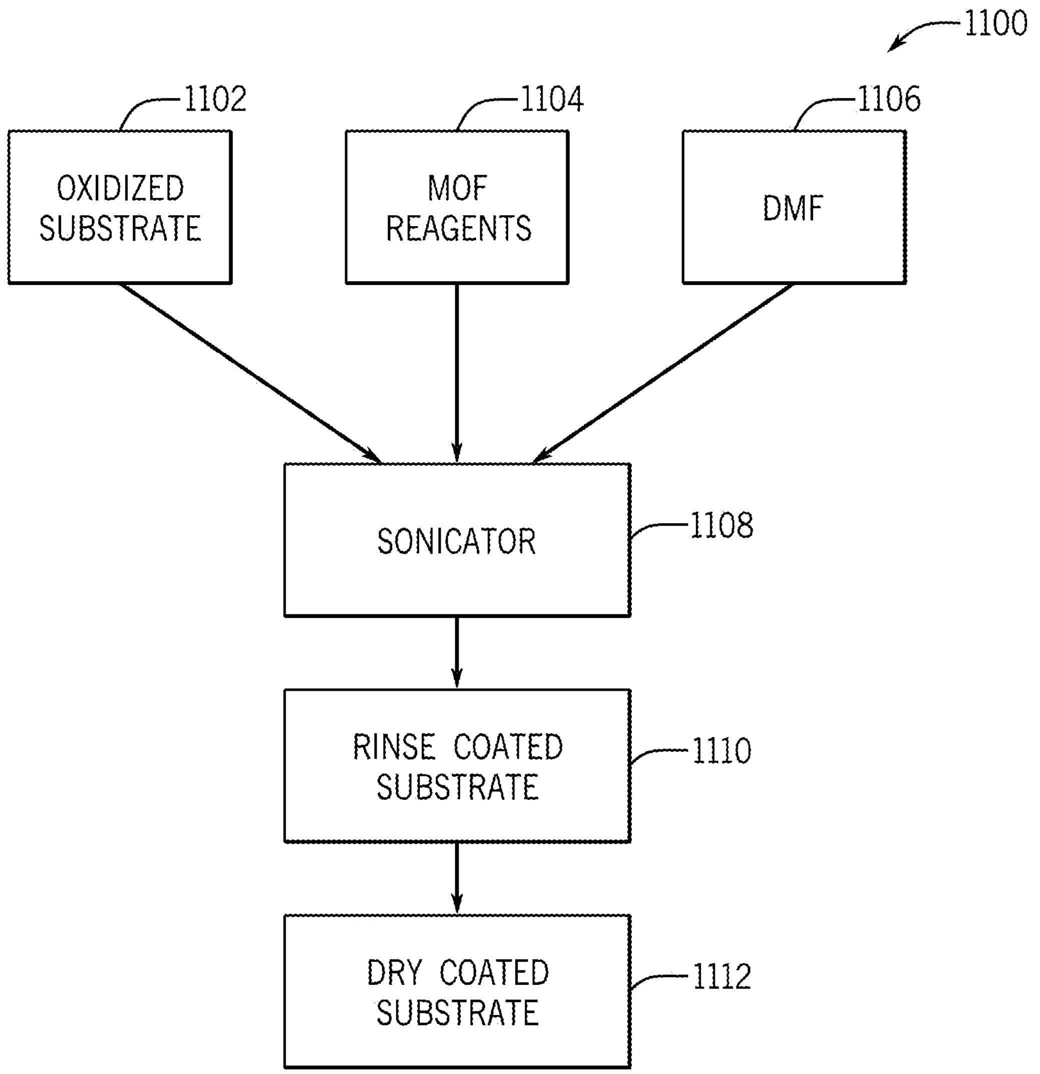
FIG. 11 illustrates an example method for adhering a metal-organic frameworks to a substrate.

Turning now to FIG. 11, which illustrates an example method 1100 for adhering a metal-organic framework to a substrate. Generally, a metal-organic framework may be adhered to and/or grown onto a substrate by submitting the metal-organic framework reagents to sonication within the presence of the substrate. In this way, the metal-organic framework may form onto the substrate. Sonication may provide the needed energy through implosion of bubbles to cause the reaction to occur.

Initially, at step 1104, MOF reagents may be added to a solution. At step 1106 an appropriate solvent, such as DMF may be added to the solution. MOF reagents 1104 may include a zinc source (e.g., zinc nitrate), a zirconium source (e.g., zirconyl chloride), and an organic ligand source (e.g., 2-aminoterephthalic acid or imidazole). Then, a substrate may be oxidized using known methods. The substrate may be any temperature resistant material such as, metal mesh wire frame, copper ribbons, graphene, a nickel sponge, graphite, carbon nanotubes, absorbent microspheres, or any combination thereof. In some embodiments, based on the substrate used, oxidation may not be required. For example, substrates naturally containing oxides, such as nickel sponges, graphite, and/or graphene oxide, may not require oxidation. At step 1102, the oxidized substrate may be included in the solution or vessel along with the MOF reagents and DMF. These constituents may then be subject to sonication at step 1108. Sonication may be facilitated by a bath sonicator or a probe sonicator submerged in the vessel of the solution. Sonication may be performed for a variable amount of time, based on the need. For example, the oxidized substrate, MOF reagents, and DMF may be sonicated for twenty minutes. Following step 1108, the resulting solution may include the substrate coated in a metal-organic framework, such as ZIF-4, ZIF-8, or UiO-66. At step 1110, the coated substrate may then be rinsed, for example with ultra-pure water and acetone. At step 112, the coated substrate may then be dried. Drying may occur by use of an air valve or by simply leaving the coated substrate and vessel uncovered for a period of time. The resulting coated substrate may be washed and subsequently dried repeatedly. Stated otherwise, the rinsing step 1110 and drying step 1112 may occur more than once. Following the drying step 1112, a temperature resistant coated with a MOF is acquired.

Such coated substrates formed utilizing the method of FIG. 11 may be the absorbent composition of the absorbent framework (e.g., absorbent framework 204, 304, or 426) and may be configured to anchor a MOF to facilitate extraction. Adhering the absorbent composition to a temperature resistant substrate through method 1100 may be advantageous for facilitating extraction, as the absorbent composition is immobilized.

Figure 14:
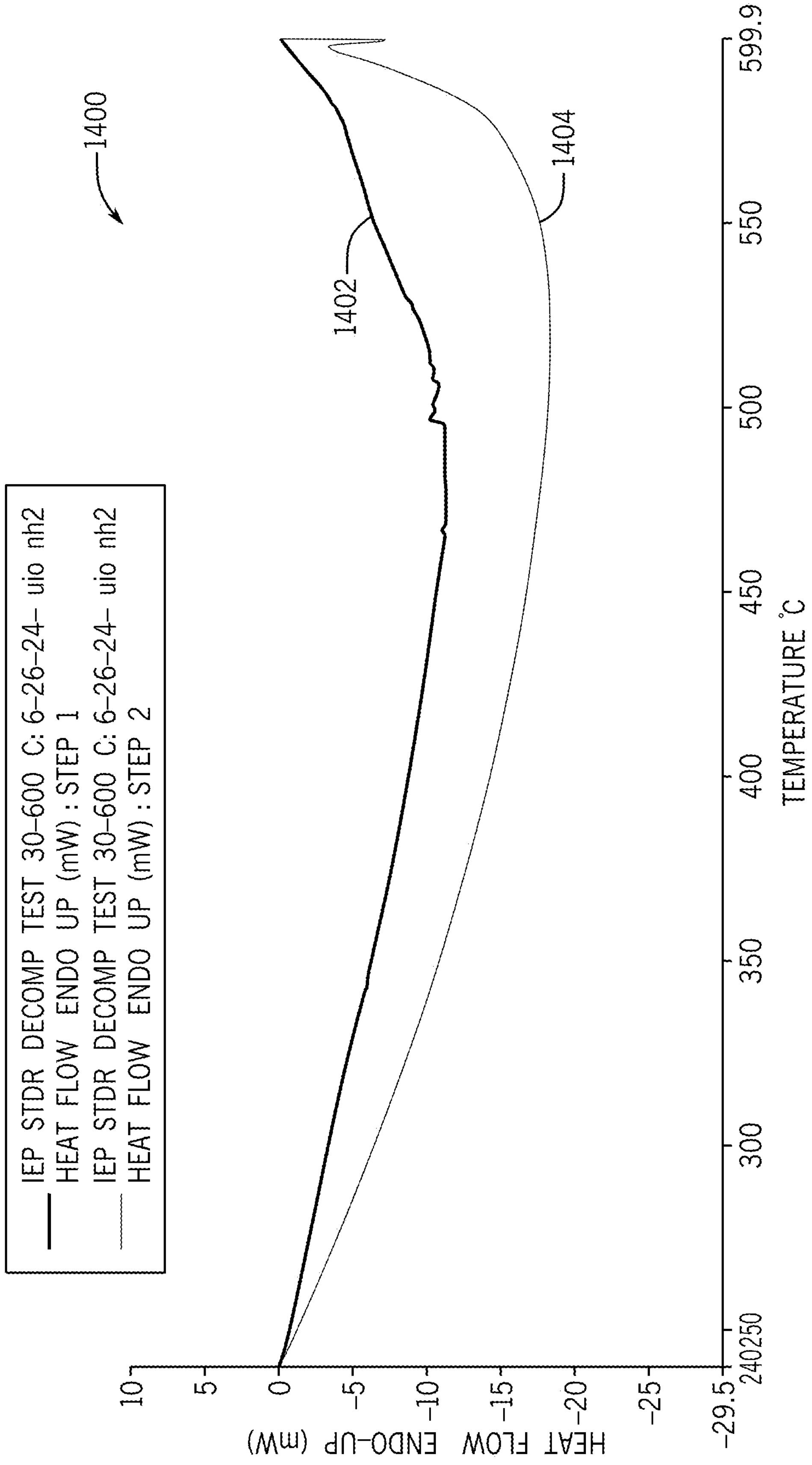
FIG. 14 illustrates a thermogram of an example metal-organic framework obtained by a differential scanning calorimeter.

Turning now to FIG. 14, a thermogram 1400 of an example metal-organic framework obtained by a differential scanning calorimeter is shown. The thermogram 1400 illustrates the thermal characteristics of the UiO-66 MOF synthesized through thermal solvolysis with reference to FIG. 10. Particularly, thermogram 1400 includes an upper line or heating line 1402, which illustrates the behavior of the sample (i.e., the UiO-66 MOF) as it is heated up, while the lower line or cooling line 1404 illustrates the behavior of the sample as it cools. In this context, behavior refers to the phase change (or lack thereof) of the sample as the amount of heat, in megawatts, is applied to increase the temperature of the sample (i.e., x-axis). Based on the characteristics of the sample and consequently the heating line 1402, an operator would be able to determine if the sample melts down, changes crystal packing, or evaporates. The heating line 1402 may also be used to determine if solvents are released or decomposed. For clarity, where a straight or an otherwise continuous curve for heating line 1402 (i.e., minimal to no sharp peaks) then the sample remained unchanged during heating. One of ordinary skill in the art will appreciate that thermogram 1400 illustrates a method of characterizing the thermal stability of the sample being tested, for example UiO-66 MOF synthesized via thermal solvolysis. Here, thermogram 1400 includes a smooth upward heating line 1402. Heating line 1402 may illustrate a small peak about 490° C. which is attributable to release of a solvent trapped within the sample. Therefore, thermogram 1400 illustrates that the sample (i.e., UiO-66 MOF synthesized via thermal solvolysis) remained relatively unchanged and stable up to 600° C. and demonstrates the increase thermal stability caused by the synthesis techniques described herein. Thus, FIG. 14 establishes the favorable thermal stability characteristic of the example UiO-66 MOF synthesized via thermal solvolysis and further establishes its differentiation from the prior art. In some embodiments, the example UiO-66 MOF is resistant to temperatures above 600° C.

Figures 15A, 15B:
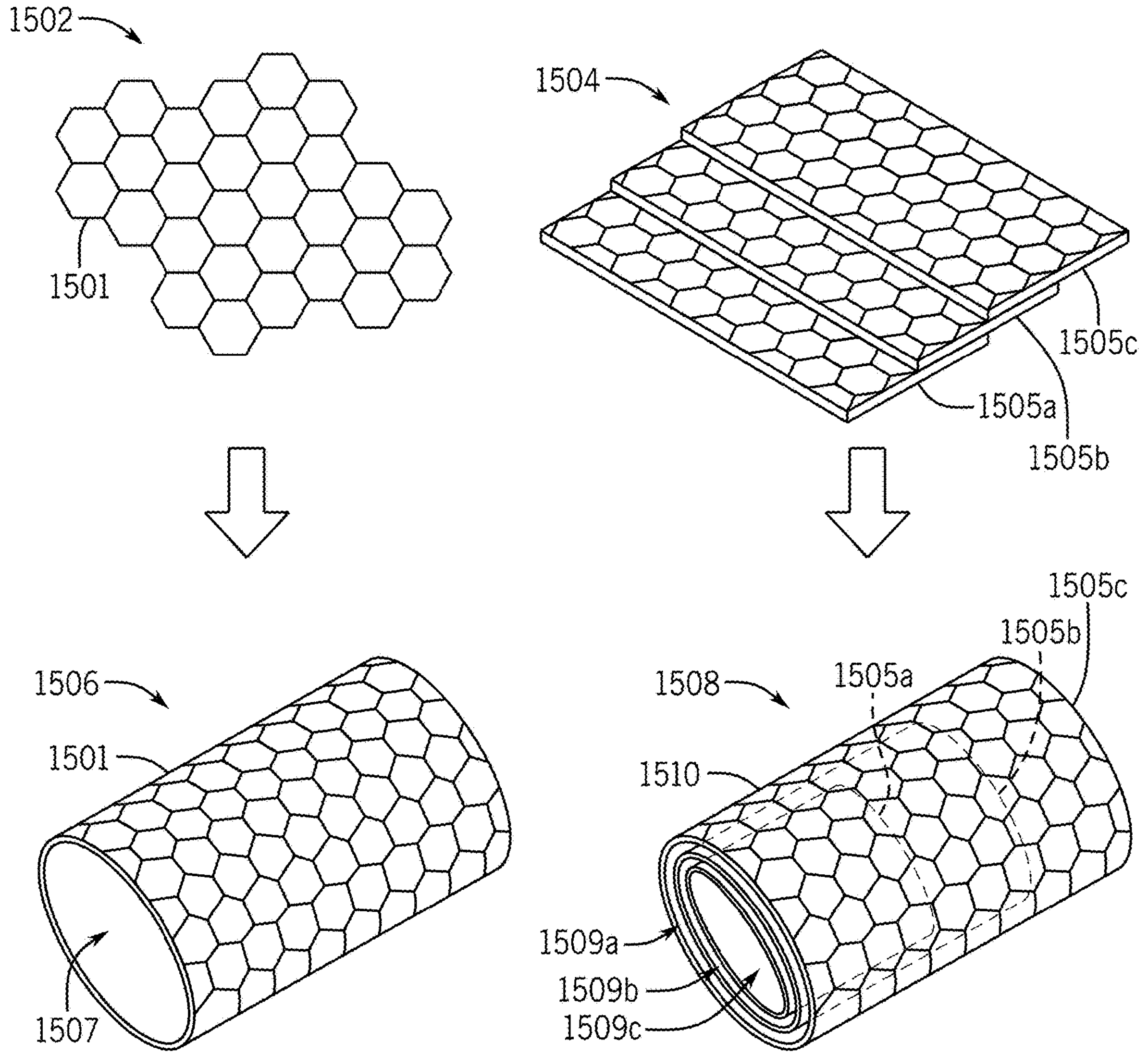
FIG. 15A illustrates an example carbon nanotube.
FIG. 15B illustrates another example carbon nanotube.

Turning now to FIGS. 15A-15B, illustrating various example absorbent compositions in the form of carbon nanotubes 1506, 1508. FIG. 15A illustrates an example structure 1502 of a graphene sheet 1501 used to form an example single-walled carbon nanotube 1501 having structure 1506. Structure 1502 may be graphene and include a graphene sheet 1501. Graphene sheet 1501 may be a single layer of carbon atoms arranged in a honeycomb pattern (as exemplified by structure 1502). FIG. 15A further illustrates an example structure 1506 of a single-walled carbon tube formed by graphene sheet 1501, thereby defining passage 1507. FIG. 15B illustrates an example graphite structure 1504 comprising a plurality of graphene sheet 1505*a*, 1505*b*, 1505*c* used to form an example multi-walled carbon nanotube 1510 having structure 1508. Structure 1504 may be graphite and include a plurality of graphene sheets 1505*a*, 1505*b*, 1505*c*. Graphite sheets 1505*a*, 1505*b*, 1505*c* may be a plurality of single layer sheets of carbon atoms arranged in a honeycomb pattern (as exemplified by structure 1504). FIG. 15B further illustrates an example structure 1508 of a multi-walled carbon tube 1510 formed by the plurality of graphene sheets 1505*a*, 1505*b*, 1505*c*, thereby defining passages 1509*a*, 1509*b*, 1509*c*. FIG. 15B illustrates an example structure of graphite 1504 used to form an example multi-walled or multi-layered carbon nanotube 1510 having structure 1508. In several embodiments, the single-walled carbon nanotube 1501 and/or the multi-walled carbon nanotube 1510 are the absorbent composition of the example absorbent compositions described herein (e.g., 207*a*, 207*b*, 207*c*).

In several embodiments, the absorbent composition 207*a*, 207*b*, 207*c* may include the carbon nanotube structures 1506, 1508 within the cartridge 600, 700. Additionally, or alternatively, the cartridge 600, 700 may be primarily made of the carbon nanotube structures 1506, 1508, and may be some mesh shape (see, e.g., FIGS. 6A-7B). For example, in FIGS. 6A and 6B, cartridge 600*a*, may have a generally circular shape (or any other shape that fits axially in the pipe 201) and have a mesh shape that includes the carbon nanotube structures 1506, 1508. In FIG. 6A, the cartridge 600*a* includes a cartridge outer wall 604 and mesh structure 602. Note that in FIG. 6A, the mesh structure 602 is in a checker-board design, though any other configuration of the mesh structure 602 may also be used in the fission product removal system 112. In FIG. 6B, the cartridge 600*b* may have an outer wall 306 and an inner wall 608 and a mesh structure 610 there between, and also defines an inner opening that allows the molten fuel salt 203 to flow through without much hindrance.

The absorbent compositions of the present invention may also include carbon nanotubes configured to capture fission products (e.g., carbon nanotubes 1506, 1508). The carbon nanotubes structures 1506, 1508 may include large pores (e.g., passages 1507, 1509*a*, 1509*b*, 1509*c*) that can hold fission products, and certain carbon nanotubes may have, or can be made to have, an affinity for certain fission products and include binding sites so the fission product binds to the carbon nanotube structure. For example, in one embodiment, the carbon nanotubes structures 1506, 1508 contains tungsten or sulfur at the binding site may have an affinity for Mo-99, such that the Mo-99 atoms may bind to the binding site in the pore of the carbon nanotube structure, which removes Mo-99 from the molten salt.

In many embodiments, the carbon nanotubes 1506, 1508 may be placed within cartridges 600*a*, 600*b*, 700*a*, 700*b* and be configured to capture fission products within the flow of molten salt. In several embodiments, the carbon nanotube structures may be built or placed onto the mesh structures 602 and 610, so that when certain fission products pass near the carbon nanotube structures 1506, 1508, the certain fission product is captured within the passages 1507, 1509*a*, 1509*b*, 1509*c* of the carbon nanotube structure 1506, 1508. As stated above, the carbon nanotube structures 1506, 1508 should be resistant to high heats, corrosion resistant, and have any affinity for at least one of the fission products so that the fission product can fit into the pore of the carbon nanotube structure. In some embodiments where the cartridges 600*a*, 600*b*, 700*a*, 700*b* are formed from the carbon nanotubes 1506, 1508, the absorbent composition may be the various MOFs described herein. Advantageously, these embodiments provide multiple, distinct mechanisms for capturing fission products, that is, through the carbon nanotubes and the MOFs contained therein.

In many embodiments, the carbon nanotubes 1506, 1508 are the temperature resistant structure used to anchor the various MOFs described herein. Stated otherwise, the oxidized substrate 1102 of FIG. 11 may be the carbon nanotubes 1506, 1508 of FIGS. 15A-15B.

Figure 16:
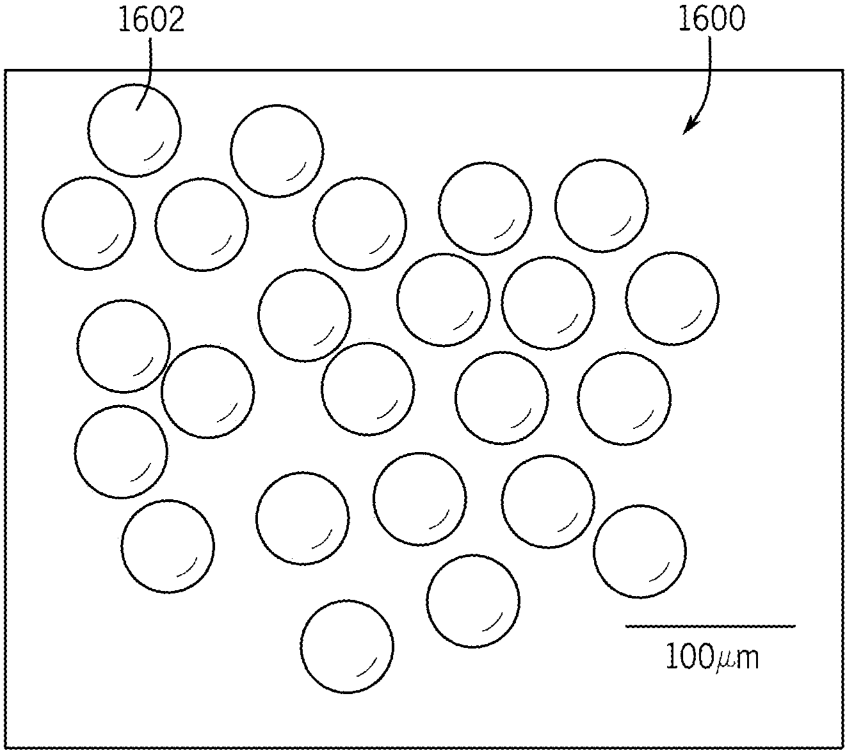
FIG. 16 illustrates an example cluster of microspheres.

Turning now to FIG. 16, an example cluster 1600 of microspheres 1602 is illustrated. FIG. 16 illustrates an example absorbent material in the form of a cluster 1600 of microspheres 1602. In several embodiments, the microspheres 1062 may be the substrate to which the various absorbent compositions are adhered to. For example, the various MOF compositions described herein may be grown onto or otherwise adhered to the cluster 1600 of microspheres 1602. In this regard, the cluster 1600 of microspheres 1602 may collectively form the absorbent composition of the various example extraction system described herein. In these embodiments, the cluster 1600 may be disposed within a temperature resistant, porous cartridge configured to enable passage of molten salt therethrough while preventing the cluster 1600 from escaping the cartridge. To facilitate the foregoing, the temperature resistant cartridge may include a plurality of pores having a diameter smaller than that than the microspheres 1602 (e.g., less than 100 μm, less than 50 μm, less than 25 μm, or in some embodiments on the nanometer scale). As such, upon contact with the surface of the microspheres 1602, fission products may chemically bind to the absorbent composition, facilitating its capture from the flow of molten salt. In some embodiments, the microspheres are suspended in the molten salt by a sintered column. This would allow the microspheres 1602 to interact with the molten salt, and the fission products disposed therein, while remaining fixed in place. As such, upon contact with the surface of the microspheres 1602, fission products may chemically bind to the absorbent composition, facilitating its capture from the flow of molten salt.

In some embodiments, the microspheres 1602 are absorbent microspheres configured to capture fission products from the flow of molten salt. The absorbent microspheres may be made with a material that has an affinity for certain fission products, or may be coated with a material that has an affinity for certain fission products. For example, in one embodiment, a certain microsphere structure may be made of a material that facilitates Mo-99 adsorption, such that the Mo-99 atoms may adsorb onto the surface of the microsphere structure, which removes Mo-99 from the molten salt.

The absorbent compositions of the present invention may also include absorbent microspheres configured to capture fission products (e.g., microspheres 1602). The microspheres 1602 may have, or can be made to have, an affinity for certain fission products and include binding sites on the surface of the microspheres 1602.

In many embodiments, the cluster of microspheres 1600 may be placed within cartridges 600*a*, 600*b*, 700*a*, 700*b* and be configured to capture fission products within the flow of molten salt. In several embodiments, the microspheres 1602 may be built or placed onto the mesh structures 602 and 610, so that when certain fission products pass near the microsphere cluster 1600, the certain fission products are captured by the binding sights of the microspheres 1602. As stated above, the microspheres 1600 should be resistant to high heats, corrosion resistant, and have any affinity for at least one of the fission products so that the fission product can bind to the microspheres 1602. In some embodiments where the cartridges 600*a*, 600*b*, 700*a*, 700*b* are coated with or partially formed from the microspheres 1602, the absorbent composition may be the various MOFs described herein. Advantageously, these embodiments provide multiple, distinct mechanisms for capturing fission products, that is, through the absorbent microspheres and the MOFs contained therein.

In some embodiments, the absorbent composition includes a metal-organic framework and hierarchical nanoporous carbon structure inside metallic foams, referred to as a composite absorbent composition. Such a structure is configured to capture fission products from the flow of molten salt. In these embodiments, the absorbent composition is a composite between a metallic foam and a reticular nanoporous framework. The composite absorbent composition combines a metallic foam (e.g., nickel foam) with various MOFs described herein. For example, the composite absorbent composition may combine metallic foam with ZIF-4 and/or UiO-66. While the various examples that follow describe a nickel foam, one of ordinary skill in the art will appreciate that any type of metallic foam may be used, such as aluminium, copper, steel, Inconel, tin, gold, silver, and others known in the art. The nickel foam forms the substrate to which the MOFs adhere or are grown onto. Advantageously, this composite absorbent composition may be operable to be temperature and corrosion resistant to withstand the environment of an MSR. Furthermore, this composite absorbent composition may be operable to capture certain fission products from the flow of molten salt. For example, Mo-99, I-131, and Sr-89.

Figure 17:
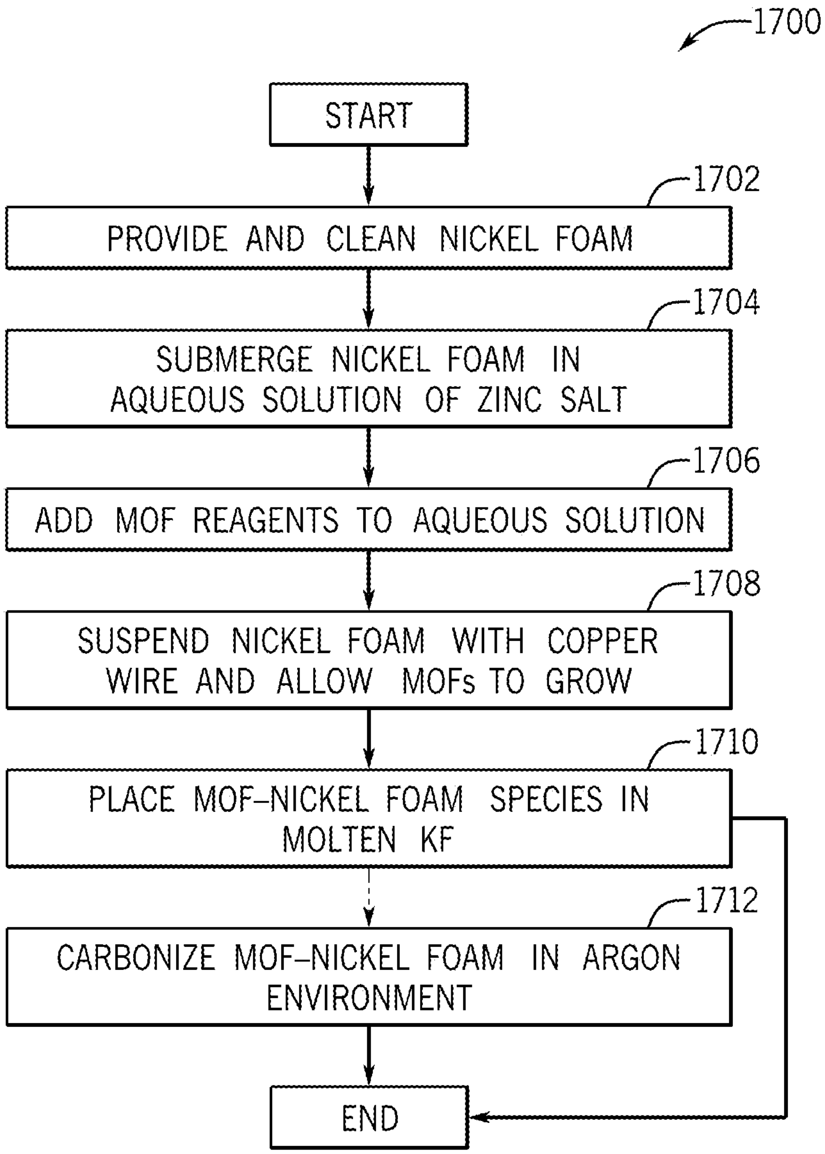
FIG. 17 illustrates an example method for creating an example composite absorbent composition.

Turning now to FIG. 17, which illustrates an example method 1700 for creating an example composite absorbent composition. At step 1702, a clean nickel foam is provided. At step 1702, the nickel foam may be cleaned by washing the nickel foam with a solution of 2 M hydrochloric acid and subsequently washing the nickel foam with a solution of ethanol and deionized water. Such washing may be accomplished by providing the nickel foam in a vessel, adding the washing solution, and mixing thoroughly. At step 1704, the nickel foam may be submerged in an aqueous solution of zinc salt. Such a salt solution may be created by dissolving an amount of zinc acetate in deionized water. However, one of ordinary skill in the art will appreciate that the salt solution may comprise other metal salts depending on the particular MOF desired to be synthesized. For example, the salt solution may be a zirconium-based salt or copper-based salt. At step 1706, MOF reagents are added to the salt solution. For example, 2-methylimidozle may be added to the solution. In some embodiments, a separate solution with MOF reagents is initially prepared and then subsequently added to the salt solution. However, one of ordinary skill in the art will appreciate that the MOF reagents may comprise other metal clusters or organic linkers depending on the particular MOF desired to be synthesized. At step 1708, the nickel foam is suspended by a copper wire in the salt and MOF reagent solution for a period of time to allow the MOF to crystalize onto the nickel foam. In other embodiments, the nickel foam is suspended by means other than a copper wire. In several embodiments, the nickel foam is suspended at room temperature for about twenty-four hours. Once the MOF has sufficiently grown or adhered to the nickel foam, it may be washed with deionized water, and dried, for example by a vacuum oven. At step 1710, the MOF-nickel foam may be combined with potassium fluoride (KF). For example, the MOF-nickel foam may be combined with a molten KF at a 1:50 mass ratio. At step 1712, this mixture may be carbonized in an argon atmosphere. For example, the mixture may be placed in an argon-filled furnace and heated for a period of time. Subsequent washing of the carbonized MOF-nickel foam may then occur, for example by washing and drying the composite with 2 M hydrochloric acid and ethanol. In several embodiments, step 1712 is skipped, and the resulting MOF-nickel foam species is not carbonized. The resulting composition may include a composite absorbent composition comprising a MOF grown or adhered to the nickel foam.

The resulting composite absorbent composition may be capable of absorbing, and subsequently extracting using the various extraction systems described herein, a variety of fission products. The particular fission products captured may depend on the type of MOF grown or adhered to the nickel foam. Additionally or alternatively, the composite absorbent composition may be synthesized utilizing the synthesis techniques described in reference to FIG. 10 in order to impart different characteristics onto the composite absorbent framework. For example, different characteristics may include pore size, density, and affinity to different fission products. In several embodiments, the MOF grown or adhered to the nickel foam is ZIF-4, ZIF-8, or UiO-66. Based on the particular synthesis method used and particular MOF created, such a composite absorbent framework may be operable to absorb and capture Mo-99, Tc-99, Np-239, Te-132, Sr-89, and/or I-131.

The present invention further contemplates a method for filtering fission products with an example fission product removal system on an example molten salt reactor, according to one embodiment of the present disclosure. At the start of this example method, a nuclear reactor, such as molten salt reactor system 100, is needed so that the fission products can be produced.

In several embodiments, metal ion fission products are created in the molten salt reactor through fission reaction of fissile material (e.g., $UF_4$). As described herein, the fission of the uranium atoms in the molten salt results in various fission products that stay in the molten fuel salt and circulate through the molten salt reactor system.

In many embodiments, one or more fission products capture system (e.g., capture system 202) may be inserted into the fission product removal system 204. The one or more absorbent frameworks 204 may be extended though the capture system pipe 210 and into the pipe 201.

In some embodiments, filtration valve 114 is opened so that molten salt 203 may flow into and through the fission product removal system 112 to capture the fission products.

In several embodiments, the suspended fission products within the molten fuel salt may be captured within the pores of the metal-organic frameworks within the one or more absorbent frameworks 204.

In one or more embodiments, molten fuel salt flow is halted in the fission product removal system 112 by closing the filtration valve 114.

In some embodiments, the one or more absorbent frameworks 204 containing the captured fission products are removed from the fission product removal system 112 by pulling the attachment rod 206 up through the capture system pipe 210 so that the one or more cartridges 204 are pulled out of the pipe 201 and through the capture system valve 212. Additionally, each of the one or more capture system valves 212 are closed once the one or more cartridges are removed from the fission product removal system 112.

Though Mo-99 is generally used as an example fission product within the disclosure, the systems and methods as described herein may be utilized to extract and process any fission product created in a molten salt reactor system. The table below shows a non-exhaustive list of potential fission products that may be extracted and processed using the disclosed systems and methods:

| Isotope | Medical Applications | Radiation | Half-life |
|---|---|---|---|
| Hydrogen-3 | Many | Beta | 12.32 years |
| Nitrogen-13 | Myocardial blood flow imaging | PET | 9.965 minutes |
| Carbon-14 | studying abnormalities that underline diabetes, gout, anemia and acromegaly; insufflation gas for procedures like endoscopies; and more | Beta/Gamma | 5700 years |
| Oxygen-15 | Blood flow imaging | PET | 122.24 seconds |
| Fluorine-18 | Used to diagnose cancer, heart disease, and epilepsy | PET (positron) | 109.77 minutes |
| Gallium-67 | Imaging of tumors and infections | Gamma | 3.2617 days |
| Gallium-68 | Imaging of tumors and infections | Positron | 68 minutes |
| Selenium-75 | Many | Gamma | 119.78 days |
| Krypton-81m | Pulmonary imaging | Gamma | 13.1 seconds |
| Strontium-89 | Bone metastases | Beta | 50.563 days |
| Yttrium-90 | Treatment of arthritis | Beta | 64.053 hours |
| Technetium-99m | Many | Gamma | 6.0067 hours |
| Molybdenum-99 | Multiple | Beta | 65.976 hours |
| Indium-111 | Many | Gamma | 2.8047 days |
| Iodine-123 | Many | Gamma | 13.22 hours |
| Iodine-125 | Clot imaging | Gamma | 59.5 days |
| Iodine-131 | Many | Beta/Gamma | 8.025 days |
| Xenon-133 | Many | Gamma | 2.198 days |
| Samarium-153 | Bone metastases | Beta/Gamma | 46.284 hours |
| Erbium-169 | Treatment of arthritis | Beta | 9.392 days |
| Radium-223 | Bond cancer therapy | Alpha | 11.43 days |

EXAMPLES

Example 1: Synthesis of MOFs

In general, this invention contemplates the use of metal-organic frameworks (MOFs) that are (1) capable of surviving the extreme heat and corrosive environment of a molten salt reactor; and (2) are capable of capturing a radionuclide of interest in the molten salt. This invention recognizes at least four approaches for capturing the desired radionuclide. First, the MOF may have pores that are large enough to allow the desired radionuclide or compound thereof (e.g., molybdenum fluoride) to penetrate the network structure of the MOF and become captured therein. Second, the MOF may be electrostatically charged with an opposite charge of the radionuclide species of interest. For instance, some forms of Mo in FLiNaK/FLiBe (fluorine salts commonly used in molten salt reactors) exist in the molten salt reactor as anionic species, and a cationic MOF present in the molten salt electrostatically attracts and captures such anionic species. Third, the MOF may be functionalized with chemical species that capture the radionuclide of interest. When the radionuclide is Mo, for example, the MOF may be functionalized by incorporating lead, tungsten, oxygen, or sulfur into the framework to capture Mo fluorides or other Mo species present in the molten salt. Fourth, the invention expressly contemplates using a combination or sub-combination of these three approaches.

The MOFs contemplated by the invention may be made using any method known in the art. For example, MOFs may be formed by using the approach outlined by Rahmidar, L. et al. “A facile approach for preparing Zr-BDC and Zr-BDC-NH2 MOFs using solvothermal method” J. Phys. Conf. Ser. 2243, (2022) 012055. Other methods are described by O. Abuzalat et al., Sonochemical fabrication of Cu (II) and Zn (II) metal-organic framework films on metal substrates, Ultrasonics-Sonochemistry 45 (2018) 180-188; M. Tanhaei, et al., Energy efficient sonochemical approach for the preparation of nanohybrid composites from graphene oxide and metal-organic framework, Inorganic Chemistry Communications 102 (2019) 185-191; C. Vaitsis et al., Metal Organic Frameworks (MOFs) and ultrasound: A review, Ultrasonics-Sonochemistry 52 (2019) 106-119; and Wharmby et al., Extreme Flexibility in a Zeolitic Imidazolate Framework: Porous to Dense Phase Transition in Desolvated ZIF-4, Angewandte Chemie. All of these references are incorporated by reference in their entirety, as if they were set forth herein.

Generally speaking, in the synthesis of ZIF-4 and ZIF-8, zinc nitrate is combined with imidazole (for ZIF-4) and with methyl imidazole (for ZIF-8). The MOF UiO-66 may be synthesized by combining zirconyl chloride with terephthalic acid.

By way of example, the synthesis of ZIF-4 will now be described. Zinc nitrate and imidazole are reacted under conditions that cause the zinc to form a bridge between neighboring imidazoles, as illustrated schematically in the following:

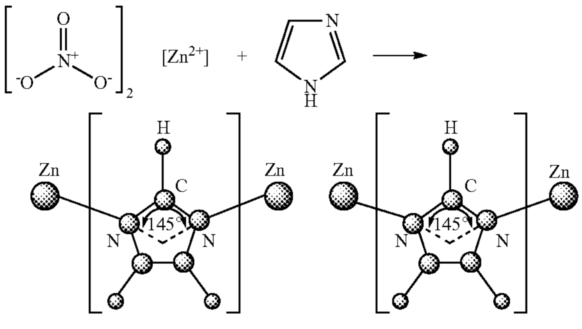

Im = Imidazole Im = Imidazole

In this way, an extended framework can be formed by combining these building blocks. In certain preferred embodiments, the mole ratio between the zinc nitrate and imidazole is at least 1:3. The reaction to form ZIF-4 may be carried out in any suitable solvent, non-limiting examples of which including dimethyl formamide (DMF), water, or a combination of methanol/ethanol. Optionally, a mineralizing agent such as HF or carbonate may be used. The ZIF-4 may be synthesized using either a solvothermal method or a sonication method. In the solvothermal method, an autoclave is used to heat the reagents and solvent under high temperatures for extended periods of time to allow the MOF to form. For example, when the solvent is DMF, the reactants and solvent may be heated in the autoclave for 72 hours at 140° C. Generally, solvothermal synthesis of MOFs can yield amorphous and/or crystalline forms. When the ZIF-4 is made using sonication, the reagents and solvents are put into a sonicator, where the sonic waves causes cavitation in which tiny air bubbles implode. Without wishing to be limited by theory, it is believed that the energy released by cavitation is absorbed by the reactants to drive the chemical reactions that form ZIF-4. In contrast to synthesis using solvothermal methods, where crystalline MOFs may be obtained, synthesis using sonication typically produces amorphous MOFs.

Either the imidazole groups in the framework of ZIF-4 or the Zn metal that bridges the imidazole groups may be substituted to form other MOFs under similar conditions. For example, to form ZIF-8, the imidazole is replaced by methyl imidazole. For UiO-66, the source of the zirconium bridging metal in the MOF structure is zirconyl chloride and the organic portion of the framework is formed using terephthalic acid.

Example 2: MOF Composites

This example describes some non-limiting embodiments of the MOF composites that are contemplated by the invention. In general, the MOF composites are formed in order to improve ease of handling of a MOF and to make it more convenient to introduce the MOF into a molten salt reactor.

For example, the following provides a protocol for the formation of a ZIF-4 MOF composite that has graphene oxide (GO), graphene, graphoil or carbon nanotubes as support.

Protocol (for Graphene Oxide, Graphene, Graphoil, or Carbon Nanotubes);

- Measure enough zinc nitrate and support so that they match a predetermined mass % ratio. e.g., 25% Zn in graphene oxide. Combine to form a mixture.
- Sonicate the mixture for 15 mins with dimethylformamide as a solvent.
- After rinsing and drying, combine the resulting material with imidazole and sonicate in DMF for 60 minutes.
- Rinse and dry the MOF composite.

An exemplary reaction scheme is shown in FIG. 7.

As another example, this invention expressly contemplates metal-MOF composites in which a metal is used as a support. In general, any metal with a sufficiently high melting point (e.g., 700° C.) may be used. The following provides a protocol for synthesizing ZIF-4 on cobalt.

Protocol (for ZIF-4 Grown on Cobalt);

- Oxidize the surface of a cobalt strip with 10 M NaOH and persulfates. Optionally, use SEM to confirm whether nanostrands are present at the surface of the metal.

Combine the metal with a solution of imidazole in DMF and sonicate. Optionally, zinc nitrate may be added to form a cobalt-imidazole-zinc composite.

Rinse and dry the composite.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A system comprising:

a molten salt reactor system comprising a molten salt, a reactor core, and an extraction system;

the extraction system coupled to the molten salt reactor system and configured to receive a flow of molten salt comprising fission products produced in the reactor core;

an absorbent framework extending from the extraction system into the molten salt by an attachment rod;

wherein the attachment rod is configured to facilitate removal of the absorbent framework from the molten salt;

wherein the absorbent framework comprises a temperature resistant cartridge configured to house an absorbent composition and enable flow of the molten salt therethrough;

wherein the absorbent composition is configured to capture fission products from the molten salt by binding to the fission products via intermolecular force interaction between the absorbent composition and the fission products;

wherein the absorbent composition is a metal-organic framework; and wherein the metal-organic framework is doped with sulfur or tungsten.

2. The system of claim 1, wherein the intermolecular forces comprise one or more force interactions between the metal-organic framework and the fission products comprising ion-ion interaction, Van der Waals forces, dipole-dipole forces, ion-dipole interactions, and/or hydrogen bonding.

3. The system of claim 1, wherein the absorbent composition comprises carbon-nanotubes comprising binding sites with an affinity to fission products.

4. The system of claim 1, wherein the absorbent composition comprises microspheres formed or coated with a material having an affinity to fission products.

5. The system of claim 1, wherein the metal-organic framework compound is a porous structure with a plurality of pores of a size to allow the fission products to penetrate the metal-organic framework compound; and wherein the metal-organic framework compound is configured to have an affinity to the fission products by having an electrostatic charge opposite to that of the fission products.

6. The system of claim 1, wherein the metal-organic framework is temperature and corrosion resistant.

7. The system of claim 1, wherein the metal-organic framework compound comprises UiO-66, ZIF-4, or ZIF-8.

8. The system of claim 7, wherein the metal-organic framework is UiO-66 configured to be resistant to temperatures of at least 600° C.

9. The system of claim 7, wherein the UiO-66 has a crystal structure and is synthesized using thermal solvolysis.

10. The system of claim 7, wherein the UiO-66 has an amorphous glass structure and is synthesized using vapor diffusion.

11. The system of claim 8, wherein the UiO-66 has an amorphous powder structure and is synthesized using sonication.

12. The system of claim 1, wherein the metal-organic framework is bound to a temperature resistant substrate via sonication.

13. The system of claim 12, wherein the temperature resistant substrate is selected from a group consisting of a metal mesh wire frame, graphene, copper wire, nickel sponge, and graphite.

14. The system of claim 1, wherein the molten salt is $LiF\text{-}BeF_2\text{-}UF_4$ and the fission products comprise molybdenum-99.

15. The system of claim 1, wherein the extraction system is a bypass coupled to a molten salt loop including a bypass valve operable to selectively facilitate flow of the molten salt to the extraction system.

16. The system of claim 15, wherein the molten salt loop is configured to facilitate circulation of the molten salt comprising fissile material through the reactor core of the molten salt reactor system; and wherein the reactor core is operable to facilitate fission reaction of the fissile material thereby producing fission products within the molten salt.

17. A system comprising:

a molten salt reactor system comprising a molten salt, a reactor core, and an extraction system;

the extraction system coupled to the molten salt reactor system and configured to receive a flow of molten salt comprising fission products produced in the reactor core;

an absorbent framework extending from the extraction system into the molten salt by an attachment rod;

wherein the attachment rod is configured to facilitate removal of the absorbent framework from the molten salt;

wherein the absorbent framework comprises a temperature resistant cartridge configured to house an absorbent composition and enable flow of the molten salt therethrough;

wherein the absorbent composition is configured to capture fission products from the molten salt by binding to the fission products via intermolecular force interaction between the absorbent composition and the fission products;

wherein the absorbent composition is a metal-organic framework compound; and wherein the metal-organic framework compound comprises ZIF-4, or ZIF-8.

18. A system comprising:

a molten salt reactor system comprising a molten salt, a reactor core, and an extraction system;

the extraction system coupled to the molten salt reactor system and configured to receive a flow of molten salt comprising fission products produced in the reactor core;

an absorbent framework extending from the extraction system into the molten salt by an attachment rod;

wherein the attachment rod is configured to facilitate removal of the absorbent framework from the molten salt;

wherein the absorbent framework comprises a temperature resistant cartridge configured to house an absorbent composition and enable flow of the molten salt therethrough;

wherein the absorbent composition is configured to absorb and/or adsorb fission products from the molten salt;

wherein the absorbent composition is a metal-organic framework; and wherein the metal-organic framework is doped with sulfur or tungsten.

* * * * *